United States Patent
Deane

(10) Patent No.: US 10,295,669 B2
(45) Date of Patent: May 21, 2019

(54) HIGH RESOLUTION, HIGH FRAME RATE, LOW POWER IMAGE SENSOR

(71) Applicant: Samsung Electronics Co., LTD., Gyeonggi-Do (KR)

(72) Inventor: Peter Deane, Moss Beach, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/945,623

(22) Filed: Apr. 4, 2018

(65) Prior Publication Data

US 2018/0231660 A1    Aug. 16, 2018

Related U.S. Application Data

(63) Continuation of application No. 14/680,906, filed on Apr. 7, 2015, now Pat. No. 9,952,323.

(60) Provisional application No. 61/976,435, filed on Apr. 7, 2014, provisional application No. 62/072,320, filed
(Continued)

(51) Int. Cl.
| | |
|---|---|
| *H04N 5/225* | (2006.01) |
| *G01S 17/89* | (2006.01) |
| *G01S 17/10* | (2006.01) |
| *G01S 17/42* | (2006.01) |
| *G01S 17/48* | (2006.01) |

(Continued)

(52) U.S. Cl.
CPC ............ *G01S 17/89* (2013.01); *G01S 7/4816* (2013.01); *G01S 7/4817* (2013.01); *G01S 7/4863* (2013.01); *G01S 17/10* (2013.01); *G01S 17/42* (2013.01); *G01S 17/48* (2013.01); *H04N 5/2256* (2013.01)

(58) Field of Classification Search
None
See application file for complete search history.

(56) References Cited

U.S. PATENT DOCUMENTS

| 8,282,222 B2 | 10/2012 | Smits |
| 2005/0012033 A1 | 1/2005 | Stern et al. |
| 2006/0192938 A1 | 8/2006 | Kawahito |
(Continued)

FOREIGN PATENT DOCUMENTS

| CN | 102388321 A | 3/2012 |
| CN | 102822693 A | 12/2012 |
(Continued)

OTHER PUBLICATIONS

Freedman, "Addressable floating light activated micro-electrical stimulators for wireless neurostimulation" (Year: 2011).*
(Continued)

*Primary Examiner* — Eileen M Adams

(57) ABSTRACT

An apparatus and method for determining a distance to an object using a binary, event-based image sensor. In one aspect, the image sensor includes memory circuitry and address decode circuitry. In one aspect, activation of a photodiode of the image sensor array by receipt of one or more photons is able to be used directly as an input to logic circuitry. In one embodiment, the image sensor includes photodiodes operating in an avalanche photodiode mode or Geiger mode. In one embodiment, the imaging sensor includes photodiodes operating as thresholded integrating pixels. The imaging sensor can be fabricated from one or more substrates having at least a first and a second voltage portion.

17 Claims, 21 Drawing Sheets

Related U.S. Application Data on Oct. 29, 2014, provisional application No. 62/072,327, filed on Oct. 29, 2014.

(51) Int. Cl.
*G01S 7/481* (2006.01)
*G01S 7/486* (2006.01)

(56) References Cited

U.S. PATENT DOCUMENTS

| | | |
|---|---|---|
| 2006/0202129 A1 | 9/2006 | Niclass et al. |
| 2007/0126886 A1* | 6/2007 | Sakurai ............... H04N 5/3575 348/222.1 |
| 2007/0182949 A1* | 8/2007 | Niclass .................... G01C 3/08 356/3 |
| 2009/0079958 A1 | 3/2009 | Gunther et al. |
| 2011/0164132 A1 | 7/2011 | Buettgen et al. |
| 2011/0240865 A1 | 10/2011 | Frach et al. |
| 2011/0316903 A1 | 12/2011 | Manabe |
| 2011/0317499 A1* | 12/2011 | Bunce ..................... G11C 7/22 365/189.11 |
| 2012/0068050 A1 | 3/2012 | Mazzillo et al. |
| 2012/0161214 A1* | 6/2012 | Kwon .................. H04N 5/335 257/292 |
| 2012/0249416 A1 | 10/2012 | Maciocci et al. |
| 2013/0153754 A1 | 6/2013 | Drader et al. |
| 2013/0175435 A1 | 7/2013 | Drader |
| 2013/0211657 A1 | 8/2013 | Zeng |
| 2013/0256285 A1 | 10/2013 | Baxter et al. |
| 2014/0184746 A1 | 7/2014 | Kang et al. |
| 2015/0061976 A1* | 3/2015 | Ferri .................. G02B 27/0101 345/9 |
| 2015/0245019 A1 | 8/2015 | Engelbrecht et al. |

FOREIGN PATENT DOCUMENTS

| | | |
|---|---|---|
| CN | 103245951 A | 8/2013 |
| JP | 2002039716 A | 2/2002 |
| JP | 2004294420 A | 10/2004 |
| JP | 2005244399 A | 9/2005 |
| JP | 2007174500 A | 7/2007 |
| JP | 2008536600 A | 9/2008 |
| JP | 2011016421 A | 1/2011 |
| JP | 2012242189 A | 12/2012 |
| JP | 2014514653 A | 6/2014 |
| WO | 2006111869 A2 | 10/2006 |
| WO | 2010103798 A1 | 9/2010 |

OTHER PUBLICATIONS (Williams, "Dual threshold X-ray photon counting pixel array detector" (Year: 2013).*
JP2016-561822 Notice of Allowance.

* cited by examiner

HIGH RESOLUTION, HIGH FRAME RATE, LOW POWER IMAGE SENSOR

REFERENCE DATA

This application is a continuation of U.S. patent application Ser. No. 14/680,906, now U.S. Pat. No. 9,952,323, filed Apr. 7, 2015, and claims the benefit of U.S. Provisional Application No. 61/976,435, filed Apr. 7, 2014, U.S. Provisional Application No. 62/072,320, filed Oct. 29, 2014, and U.S. Provisional Application No. 62/072,327 filed Oct. 29, 2014, the benefit of the earlier filing dates of which is hereby claimed under 35 U.S.C. § 119(e) and the contents of which are further incorporated by reference in their entirety.

TECHNICAL FIELD

The present invention relates to the field of integrated circuits. In particular, it concerns an image sensor based on avalanche photodiodes that measures distance of objects.

BACKGROUND

Ranging is a process whereby a distance from a detector to an object of interest may be determined. Conventional ranging systems may serve one or more functions, including proximity sensing, remote sensing and/or three-dimensional (3D) imaging. These systems typically include an interrogation source (e.g., a light source) for illuminating the object of interest, and an image sensor array (e.g., a complementary metal oxide semiconductor (CMOS) image sensor) for registering a return signal from the interaction of the interrogation source and the object. Conventional light interrogation systems may capture images using a sequential frame-based image sensor and apply image processing and pattern recognition algorithms to the captured images. The algorithms are typically based on knowledge of the projected broadcast patterns (e.g. structured light) or phase correlated beam sweeps of the interrogation source. Typical image sensors require integration of many photons (e.g. 1000 or more photons) on each pixel in order to establish an optical signal of adequate signal-to-noise ratio (SNR), due to the limited sensitivity of each respective pixel. The SNR requirements of the conventional image sensor in turn create demands on the power of the light source (e.g., the interrogation beam which may be, for example, in the visible wavelength range and/or infrared (IR) wavelength range). Stated differently, the interrogation beam must be able to provide an adequate number of photons for detection, in order to extract meaningful information regarding the scanned environment (or object).

An image sensor having increased sensitivity (e.g., one including avalanche photodiodes) enables signal detection with fewer incident photons from the interrogation source, but also becomes more sensitive to background noise. When the range to an object of interest is large, the photons from the interrogation source have a large time-of-flight (TOF). For a system based on reflected (or backscattered) illumination from the object of interest, radiometric dissipation of the interrogation source (by $1/R^4$, where R=the range, due to the out-and-back path) requires that the interrogation source power be large in order to provide an adequate SNR over the large distances possible for detection. In such scenarios the signal from the "scene" may be overwhelmed by the background, (e.g., large radiation of a bright sunny day) which causes activation of the photodiodes in the image sensor prior to receipt of the interrogation signal returning from the object of interest. Traditionally, TOF ranging issues, especially power consumed (which typically scales with the distance to the interrogated object(s)), along with the size of other system components, limits the use of small form factor devices, e.g., handheld devices and/or wearables, for applications such as virtual and/or augmented reality. Conventional TOF-based systems are too power hungry and slow (regarding latency, and frame rate) to be practical for use in mobile phones, wearables, and other mobile applications.

In conventional systems, the whole image sensor array is sampled (all pixels) in order to develop a grayscale image. Achieving a high frame rate at low power with that scheme is not possible, when using high-definition (many pixels, e.g., 1280×720) image sensor—the data stream is too large. Further, image sensors having high resolution typically use a memory-inspired array address and readout architecture, which severely limits the temporal information available, this temporal information being related to the arrival time of photons to the sensor. Massive amounts of pixel data must be sorted to find the events of interest in the conventional image sensor, a process that can be very power-inefficient. Further, considering the great speed of light (approximately 0.3 meters per nanosecond), even a system capable of achieving fine timing resolution, e.g., 0.5 nanoseconds, would be limited in spatial resolution to 0.15 meters, which may be too unresolved for many applications.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In one aspect, embodiments according to the present disclosure provide an apparatus and method for determining a distance (e.g., range) to an object. The apparatus includes an interrogation source for illuminating an object, and an image sensor including highly sensitive photodetector devices to detect illumination reflected from the object and to develop a signal from the detected illumination. An analysis circuit operating with the interrogation source and the image sensor is able to determine a distance to the object based on triangulation derived from the image sensor signal, corresponding to the received illumination reflected from the object. In an embodiment, a subset of photodetector devices in the image sensor is activated in concert with activation of the interrogation source, this activation defining one distance measurement period of the apparatus, a distance being determined in this period by a location of the particular photodetector device in the image sensor that develops a signal in response to incident reflected illumination. In an embodiment, distance to an object is determined based on an amount of charge stored on photodetector devices during a measurement period in response to incident reflected illumination.

According to embodiments of the present invention, a system is provided for measuring a distance to an object. The system includes a photonic interrogation source that is configured to emit an interrogation beam, at a controlled angle. The interrogation beam is for illuminating the object. The system includes an image sensor that is coupled to and operates in conjunction with the interrogation source. The image sensor is configured to receive a reflected beam generated by illumination of the object (from the interrogation beam), and the image sensor develops a signal based on a characteristic of the reflected beam. The system includes an analysis circuit that is coupled to and operates in conjunction with the interrogation source and to the image sensor. The analysis circuit is configured to determine a distance to the object based upon the controlled angle of the photonic interrogation source and upon the signal generated by the image sensor.

An image sensor may be configured in several ways for function in a ranging system, including image sensor architectures adapted for triangulation to an object using the address of an activated pixel, as well as those including time-of-flight information at the pixel level as described herein. In one aspect the use of a highly sensitive photodiode (e.g., a SPAD) enables identification of a specific location in the image sensor array where illumination is incident via reflection from an object, with great spatial discrimination. The entire image sensor is able to be binary when using a latch triggered directly from a SPAD firing event. Alternatively, the highly sensitive photodiode can be adapted for use as a trigger in a pixel-level TOF 3D system, where a charge level of the pixel is proportional to the time of flight of photons from the interrogation source, to the imaged object, and back to the image sensor.

An image sensor according to embodiments of the present disclosure can be fabricated to have a stacked substrate orientation, where a top substrate (that is, the substrate upon which illumination is incident) includes photosensitive elements (e.g., avalanche photodiodes) and a bottom substrate includes control logic and circuitry corresponding to the functionality described herein.

Embodiments according to the present disclosure provide a 3D imaging system having a completely digital image sensor architecture, as described herein.

In one aspect, a method of detecting an optical event includes interrogating an object with a photonic interrogation beam, activating an array of pixels substantially concurrent with activation of the photonic interrogation beam, the pixels comprising avalanche photodiodes, a voltage bias level of avalanche photodiodes corresponding to pixel operation in one of Geiger mode and avalanche mode; receiving a reflected beam from the interrogating the object, at the array; generating a signal corresponding to a location of incidence of the reflected beam on the array, the signal corresponding to at least one of a pixel array address and a time-of-flight (TOF) of the photonic interrogation beam and the reflected beam; and determining a distance to the object based upon the signal.

According to an embodiment, the interrogating is performed at a controlled angle of the photonic interrogation beam, wherein an interrogation source emitting the interrogation beam, and the array, are disposed at a controlled distance from each other, and wherein the determining the distance is based on triangulating the controlled angle, the controlled distance, and an angle of incidence determined by the pixel array address of the reflected beam. In a further embodiment, the activating the array includes shuttering, wherein shuttering includes activating a plurality of subsets of the array in a time-varying manner, wherein a subset activation period for each subset of the plurality of subsets is based upon a value of the controlled angle and a rate at which the controlled angle is varied. In a further embodiment, the generating the signal is based on the receiving the reflected beam by a pixel included in an active subset of the plurality of subsets, and further wherein any detection of the reflected beam by a remainder of pixels comprised by the active subset is not included in the signal. In an embodiment, the generating the signal includes generating a set signal by a latch circuit of a pixel of the array in direct response to the pixel receiving the reflected beam, wherein the set signal forwards at least one of a row address and a column address of the pixel to at least one of a column decoder circuit and a row decoder circuit. In a further embodiment, the set signal is a positive voltage pulse developed by a ground-referenced photodiode current. In an embodiment, the generating the signal includes generating a column decode signal at a pixel of the array in response to the pixel receiving the reflected beam, wherein the column decode signal forwards the column address of the pixel to a row latch circuit. In an embodiment, pixels of the array comprise at least one charge storage element, and further activating the photonic interrogation beam and the array of avalanche photodiodes initiates and terminates a changing charge level of the at least one charge storage element during a time period between an emission from the interrogation beam and the receiving the reflected beam from the object, and further wherein the charge level corresponds with the TOF.

According to an aspect of the present disclosure, an optical event sensor for detecting an optical event includes an array of pixels operable to be activated substantially concurrent with activation of a photonic interrogation source, the pixels including avalanche photodiodes, a voltage bias level of avalanche photodiodes corresponding to pixel operation in one of Geiger mode and avalanche mode; wherein the array of pixels is operable to receive a reflected beam from the object, at the array, and to generate a signal corresponding to a location of incidence of the reflected beam on the array, wherein the signal corresponds to at least one of a pixel array address and a time-of-flight (TOF) of the interrogation beam and the reflected beam, and wherein the array of pixels is operable to determine a distance to the object based upon the signal.

In an embodiment, the object is interrogated at a controlled angle of the photonic interrogation source, and further the photonic interrogation source and the array of pixels are disposed at a controlled distance from each other, and the distance is determined based on triangulating the controlled angle, the controlled distance, and an angle of incidence determined by the pixel array address of the reflected beam. In a further embodiment, the array is operable to shutter, including activating a plurality of subsets of the array in a time-varying manner, wherein a subset activation period for each subset of the plurality of subsets is based upon a value of the controlled angle and a rate at which the controlled angle is varied. In a further embodiment, the signal is generated based on detection of the reflected beam by a first pixel of an active subset of the plurality of subsets, and any detection of the reflected beam by a remainder of pixels comprised by the active subset is not included in the signal. In an embodiment the signal includes a set signal by a latch circuit of a pixel of the array, the set signal in direct response to the pixel receiving the reflected beam, wherein the set signal forwards at least one of a row address and a column address of the pixel to at least one of a column decoder circuit and a row decoder circuit. In a further embodiment the set signal is a positive voltage pulse developed by a ground-referenced photodiode current. In an embodiment, the signal includes a column decode signal at a pixel of the array, the column decode signal in response to the pixel receiving the reflected beam, wherein the column decode signal forwards the column address of the pixel to a row latch circuit. In a further embodiment, the array of pixels includes a first substrate configured to operate at a first voltage and a second substrate configured to operate at a second voltage, wherein the first voltage is higher than the second voltage, and wherein the photodiode is included in the first substrate and wherein logic and control circuitry of the array of pixels is included in the second substrate. In an embodiment, pixels of the array included at least one charge storage element, and further wherein activation of the photonic interrogation beam and the array of avalanche photodiodes is operable to initiate and terminate a changing charge level of the at least one charge storage element during a time period between an emission from the interrogation beam and the receiving the reflected beam from the object, and further wherein the charge level corresponds with the TOF.

According to an aspect of the present disclosure, a distance measuring mobile apparatus includes a processor; a memory operatively coupled to the processor; a photonic interrogation source configured to emit an interrogation beam for illuminating an object; and an image sensor including an array of pixels and corresponding charge storage elements, the image sensor operatively coupled to the interrogation source and to the processor, the image sensor configured to receive a reflected beam generated by illumination of the object by the interrogation beam, and to develop a signal based on the reflected beam on the array, wherein activation of the interrogation source and the image sensor initiates and terminates a changing charge level of the charge storage elements during a time period between an emission from the interrogation beam and a reception of a reflected beam from the object, and further wherein the charge level is comprised by the signal; wherein the processor is operable to receive the signal and to output distance information of the object based on the signal.

According to an embodiment, the array of pixels includes an array of avalanche photodiodes operating in Geiger mode. In a further embodiment, the charge storage elements include a capacitor, the capacitor configured to terminate charging upon receiving a signal generated by a photodiode of a corresponding pixel in response reception of the reflected beam.

While a highly sensitive, binary-like photodiode is enabled for operation of image sensor architectures of the present disclosure, conventional (e.g., active) pixel architectures are also able to be utilized, for both image sensor modalities (e.g., for triangulation via pixel address, and for pixel-level TOF information). The active pixel requires sufficient sensitivity to detect a meaningful number of interrogation source photons to develop a voltage signal. However, using a voltage thresholding approach, digital image sensor architectures according to the embodiments described herein may be realized with active pixels—but when using avalanche photodiodes or SPADs, no sense amplifiers or analog-to-digital converters are required for the image sensor.

Therefore, a range of image sensor architecture implementations is contemplated—triangulation using a SPAD array; triangulation using an active pixel array; TOF using a SPAD array; and, TOF using an active pixel array. Each of these architecture implementations provides many degrees of freedom in controlling the operation of an imaging sensor. The ability to vary the timing between the activation of an interrogation source and the activation of an image sensor provides control of a depth of field for an interrogated field of view. Control of the output power of the interrogation source enables improvements in signal-to-noise over ambient light, as well as the ability to tune the interrogation source power for the desired range of interrogation—objects interrogated closer to the image sensor require less illumination than those located further away. The output framerate of the image sensor may be varied by controlling the number of pixels that are active for a given measurement. These features of architectures according to the present disclosure provide optimization to be made for power consumption, framerate, and/or the image resolution of a 3D imaging system.

In the context of the present disclosure, the term "illuminating" generally refers to an electromagnetic wave in the infrared, visible light, and/or ultraviolet range.

In the context of the present disclosure, the term "multiplexer" refers to an electrical or opto-electrical switch with selection inputs controllable by either electrical or photonic signals.

In the context of the present disclosure, the term "array" refers to an arrangement of elements in R rows and C columns, where R and C are each greater than or equal to unity. For example, an array can be a complete set of photodiodes in an image sensor, and/or pixels in an image sensor. Further, R and C may have equal or unequal value, and a spacing between rows and between columns may be equal or unequal. The terms "sub-array" and "subset of the array" refer to a group of array elements fewer in number than the full array, which may be either contiguous or non-contiguous.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF DRAWINGS

The accompanying drawings, which are incorporated in and form a part of this specification, illustrate embodiments of the invention and, together with the description, serve to explain the principles of the invention.

DETAILED DESCRIPTION

In one aspect, embodiments of the present disclosure provide a system having an interrogation source operatively coupled to an image sensor. The interrogation source (for example, a laser tuned to an infrared (IR) wavelength) can be configured to illuminate an object or objects within the field of view of the system, and the image sensor is configured to detect reflected illumination from the object of interest. The image sensor includes an array of highly photo-sensitive detectors (e.g., an array of avalanche photodiodes). In an embodiment, an avalanche photodiode comprises a p-n junction device operating beyond its breakdown region, operating as a single photon avalanche diode (SPAD), such that an incident photon is able to cause a self-sustained avalanche (e.g., an avalanche photodiode operating in so-called Geiger mode). In an embodiment, the image sensor responds to one (or a few) incident photons and develops a signal indicating photon detection at a particular image sensor array address. Stated differently, reception of a few photons by a photosensitive element of a pixel is adequate for detection by the pixel, leading to a reduction in the number of photons required to detect an optical event when using such a pixel (as compared with a pixel operating in a conventional manner, with photodiodes integrating hundreds of photons over a time period in order to detect illumination and develop a signal). By accurate position information derived by a pixel address, along with a known interrogation source angle and distance to an image sensor, a distance to an object can be determined at great accuracy with minimal circuit complexity, cost, and power consumption. Further, the image sensor is able to be configured to operate by enabling time-varying subsets of image array pixels (e.g., a rolling pixel sub-array), in concert with activation of the interrogation source, in order to reduce both background noise and system power requirements. Use of such allows, for example, much lower optical output power to be used in the corresponding light source of an optical interrogation system, one possible advantage of lower optical power requirements being human eye safety.

Figure 1:
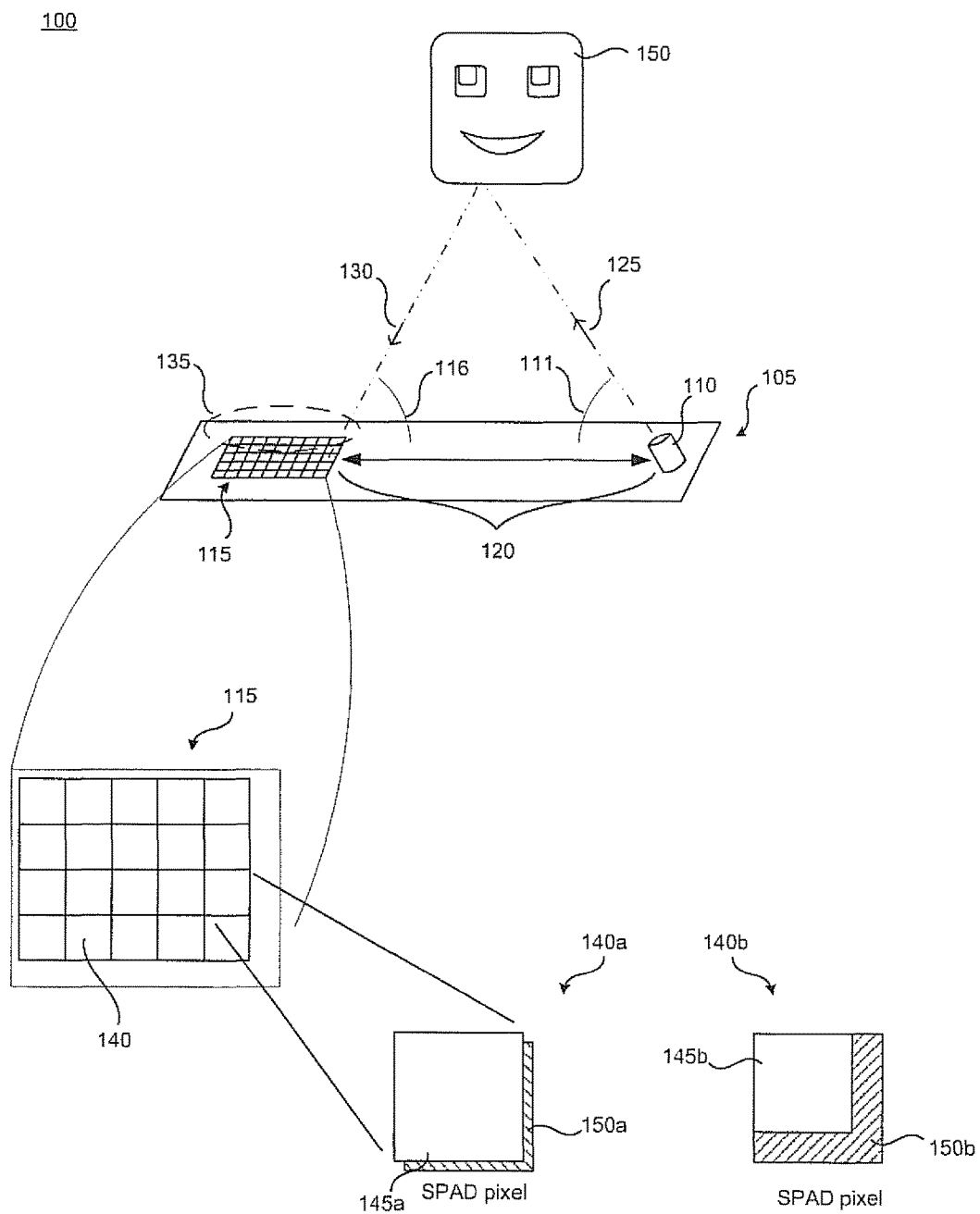
FIG. 1 depicts an exemplary optical interrogation system, in accordance with embodiments of the present invention.

It is appreciated that single- or few-photon event detection pixels are applicable to various optical interrogation-based sensing modalities including, but not limited to, ranging, TOF and 3D imaging applications. In an embodiment, the individual pixels of an image sensor array are able to determine TOF information of received illumination reflected (or backscattered) from the object(s) of interest. An optical package may be included on the system, which is able to filter the wavelength of incoming radiation to the image sensor and/or function to focus incident radiation upon the light-sensitive portions of pixel (e.g., improve fill factor of the pixel). In an embodiment, the image sensor array is enabled to receive illumination in a synchronous manner with the activation of the interrogation source. The system of the present disclosure is able to discriminate, over moderate distances, a photon burst received from the interrogation source rather than from background noise, in bright ambient light, with a minimum of on-chip circuitry, latency, and power consumption. FIG. 1 provides an overview of a ranging device according to an embodiment of the present disclosure. It is appreciated that an optical interrogation system utilizing such a single- or few-photon pixel is able to be integrated into a host device such as a mobile device (e.g. smart phone, tablet, etc.) or other host devices.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, and components, have not been described in detail as not to unnecessarily obscure aspects and features of the subject matter.

Portions of the detailed description that follows are presented and discussed in terms of a method. Although steps and sequencing thereof are disclosed in figures herein (e.g., FIGS. 8 and 21) describing the operations of these methods, such steps and sequencing are exemplary. Embodiments are well suited to performing various other steps or variations of the steps recited in the flowcharts of the figures herein, and in a sequence other than that depicted and described herein.

Embodiments described herein may be discussed in the general context of computer-executable instructions residing on some form of computer-usable medium, such as program modules, executed by one or more computers or other computing devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the following embodiments, a technique to perform high resolution, high frame rate, low power consumption ranging is described. Embodiments include a method of determining a distance to an object including steps of illuminating the object with an interrogation beam, receiving reflected illumination from an object using a highly photosensitive image sensor, and determining a distance to the object based on an address of an activated pixel using trigonometry, and/or TOF information determined at the pixel level.

SPAD Control

Figure 2:
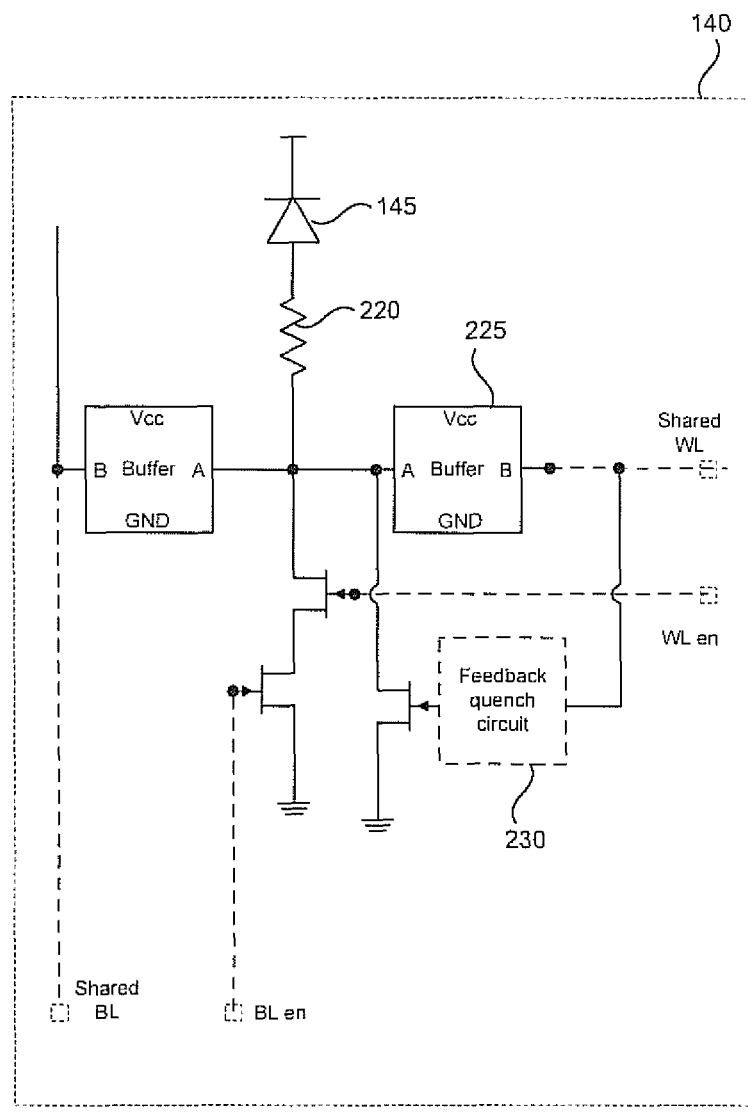
FIG. 2 depicts an exemplary avalanche photodiode pixel, in accordance with embodiments of the present invention.

In an embodiment of the present invention, avalanche photodiodes of an image sensor (including, e.g. local and/or global variable reverse biasing) may be used to increase sensitivity and reduce exposure time requirements in ranging and 3D imaging applications. An avalanche photodiode in Geiger mode (e.g., a SPAD) operates in very extreme reverse bias condition, beyond natural reverse bias breakdown, and may be held at such a voltage only temporarily until an event triggers it to (very rapidly) develop current. There is therefore a time factor when using such a device as a detector, as the SPAD cannot be maintained in the extreme reverse bias condition for very long. The large current developed by a SPAD following an event trigger can be destructive, so often a resistor is added to the diode in order to limit the current, such that once the SPAD does "fire" (e.g., rapidly generate current) it may output current to a safe level in a short amount of time. Once fired, the SPAD avalanche current is quenched by the resistor or other load mechanism. The voltage at the SPAD may be buffered (and likewise, a change in polarity may be induced) for pixel operation. An example of an avalanche photodiode according to the present disclosure is depicted in FIG. 2.

A SPAD responds very quickly to a photon event, on the order of picoseconds. Factors such as the wavelength of incident photons, environmental temperature, the cell size (area) of the SPAD, and the extent of voltage bias (e.g., overvoltage), quantum efficiency, and dark count rate (DCR) affect functionality of the SPAD. Once discharged, a SPAD takes some time to recharge (so-called "deadtime"), typically in the approximate range of 20-40 nanoseconds. Typically, only a few tens of photons (approximately 20 photons, dependent on photon wavelength and detector cell size) are sufficient to trigger the rapid current generation of the SPAD.

In the present embodiment, a pixel comprising a SPAD is able to be configured for variable pixel sensitivity on a local and/or global level, and can be tuned according to ambient light and/or depth of field requirements (i.e. the reverse bias voltage control can be used to adjust photodiode sensitivity according to exposure constraints and/or requirements). In a system of this operation, there is a range limit set by the photodiode sensitivity. When operating in Geiger mode, a SPAD possesses a dark count rate (DCR), a measure of SPAD noise whose value is dependent on factors such as the SPAD cell size, the temperature of the SPAD, and the overvoltage (e.g., the voltage level beyond breakdown threshold). The DCR of the SPAD, in the absence of any illumination, provides a statistical measure of the length of time a SPAD may remain in Geiger mode before experiencing an avalanche event. In combination with ambient light, DCR provides a background noise signal that must be distinguished from that of the transmission of the interrogation beam in order for a meaningful signal to be developed. Therefore the DCR, when coupled with ambient photons accumulated during the TOF, provides an estimate of a maximum range at which objects are able to be interrogated.

In an embodiment of the present disclosure, an optical notch filter is used (e.g., at optics 135 of FIG. 1) to prevent excessive background noise photons from affecting the pixels, outside of the interrogation wavelength of interest. The interrogation source is able to be selected, or tuned, to emit wavelengths near the center of the optical notch filter. In a further embodiment, the center wavelength of the optical notch filter is selected so as to minimize background radiation from the sun—for example, to have a center wavelength corresponding to a strong atmospheric absorption line, such as 850 nanometers or 940 nanometers (e.g., atmospheric absorption lines due to water). Such an implementation of the present disclosure would allow, for example, higher photodiode gain. A tradeoff of decreasing the width of the optical filter is that a decrease is also had in the field of view for the system. A tunable interrogation source, while potentially adding cost, may serve to further improve SNR. The total optical power, as well as the wavelength, should be considered when operation is anticipated in environments where eye harm may arise. Additionally, the imaging frame rate may be determined based on pixel sensitivity (i.e. exposure time requirements) and/or readout rate and/or pixel array size. High frame rate refresh can be employed in order to achieve adequately high Nyquist sampling rates of a moving object.

Embodiments of the present disclosure provide an image sensor having extremely sensitive photodiodes, whereby distance determination to an object is able to be made by a novel addressing scheme reporting the array address of a pixel activation resulting from incident interrogation illumination. It should be noted that the present invention is not limited to SPAD technology, and that any photon detector of sufficient sensitivity can be used.

Ranging Via Integrated Triangulation

In one aspect, embodiments of the present disclosure provide a photonic interrogation system for determining a distance to an object. FIG. 1 is a schematic illustration of an exemplary photonic interrogation device 105 to determine a distance to an object, in accordance with an embodiment of the present disclosure. Interrogation device 105 includes an interrogation source 110 and an image sensor 115. Interrogation source 110 and image sensor 115 are separated by a defined distance 120 (as a non-limiting example, distance 120 is 5 centimeters). In an embodiment, distance 120 can be modified in a controlled manner. Interrogation source 110 is configured to emit an interrogation beam 125, and image sensor 115 is configured to detect returned illumination 130 from an object in the field of view of the optical device 105. Imaging sensor 115 includes an array of photosensitive diodes 140, for example, avalanche photodiodes, which form pixels of image sensor 115.

In an embodiment according to the present disclosure, array 140 includes a SPAD pixel 140a formed by at least two stacked wafers (or substrates). The SPAD pixel 140a can operate in a linear avalanche mode, or in Geiger mode, based on the bias voltage. SPAD pixel 140a includes a photosensitive area 145a, and pixel circuits in region 150a (e.g., high voltage line, pixel input/output lines). According to an embodiment, pixel circuit elements corresponding to pixel circuit logic are formed on a separate substrate from the SPAD cell (e.g., the photosensitive region formed on a substrate corresponding to p/n junctions). That is, a substrate having a plurality of SPAD cells can be stacked on top of a wafer having a plurality of logic and control circuitry (e.g., transistors, enable lines, etc.), as is described herein. In an embodiment according to the present disclosure, array 140 includes a SPAD pixel 140b formed on one wafer, where photosensitive region 145b can be adjacent to pixel circuit logic 150b (e.g., high voltage line, pixel input/output, TOF information storage element(s)). Pixels 140a and 140b can include at least one time-of-flight (TOF) element, that is, an avalanche photodiode operating in either linear avalanche or Geiger mode and that includes, for example, a storage capacitor configured to store charge corresponding to a TOF value. An optical system 135 may be included in device 105, whereby optical device 135 focuses and/or filters incident reflection onto image sensor 115. The optical interrogation device 105 may include an ambient light sensor (not shown). As shown in FIG. 1, interrogation beam 125 is directed toward object 150, and returned illumination 130 falls upon image sensor 115.

In an embodiment, interrogation source 110 is a laser, for example a laser having a resonant MEMs scanning mirror (e.g., a vertical cavity surface-emitting laser (VCSEL). The interrogation source 110 is able to emit radiation at an IR wavelength, or at other wavelengths. In an embodiment, the mirror is resonant in the x direction (e.g., along image sensor array columns), and stepped in the y-direction (e.g., along image sensor array rows). A resonant scanning laser is able to sweep an interrogation beam 125 across a field of view for the interrogation device 105. In an embodiment, the interrogation source 110 generates a raster scan of high intensity photons (e.g., interrogation beam 125) from the laser. In an embodiment, in order to account for the resonant motion of interrogation source 110 across the field of view, activation of the interrogation beam 125 is controlled in order to provide substantially equal irradiation across image sensor 115 (e.g., sinusoidal linearization of a duty cycle of interrogation source 110, based on interrogation source angle 111).

Activation of the interrogation source 110 in a collimated "spot" mode, at particular angles (e.g., interrogation source angle 111) and with a defined pulse period, serves to "paint" a grid image, one pixel at a time at the image sensor 115. A scanning rate of the mirror (and therefore the laser beam) is an important factor in system timing, particularly pixel activation timing, as is discussed herein. The interrogation source 110 and the image sensor 115 are coplanar, constraining an image sensor 115 field of view of the scene to a same plane as the device 105's field of view. Therefore, any return photons (e.g., returned illumination 130) will be in the same plane as the interrogation beam 125. So, with regard to the array of image sensor 115, the row having an expected photodiode excitation will be known, based on the angle 111 of the interrogation source 110. However, the particular column within the row is not known, because the distance to the object 150 (and therefore the return angle of return illumination 130) is unknown. Object 150 may be at multiple distances/locations within the device 105 field of view.

The angle that the returned light 130 comes into the optics (angle 116) determines the column of the image sensor array having photodiode activation (e.g., the position within the row), and therefore the distance (via triangulation). Lensing and optics (e.g., optics 135) of the device 105 including image sensor 115, will see a spot (solid angle of light) at a distance, up to a range limit of viewing. Photons from that spot (the spot on the object 150), hitting an aperture of the image sensor 115, will be focused onto one array element (e.g., one pixel). In an alternative embodiment, the interrogation source 110 operates in a "fan" mode, wherein a stripe of illumination is emitted. In an embodiment the stripe is substantially perpendicular to the axis of interrogation source movement (e.g., the resonance axis). In such an embodiment, returned illumination 130 may be incident upon an entire column (or row) of array elements, parallel to the orientation of the interrogation beam 125. Due to the features of the interrogated object (e.g., object contours), the returned illumination 130 may also return non-planar and be incident over several columns, corresponding to the contours of the object. In fan mode, all photodiodes rows are active all at once. The output power of the interrogation source can be increased, to compensate for distribution over a whole line (all rows). The image sensor 115 architecture, for such a device, is able to report a photon burst from the interrogation source 110 in bright sunlight, with minimum latency, minimum power consumption, and high refresh frequency—all with minimum of on-chip circuitry. The distance determination to an object is determined, in an embodiment, using accurate position trigonometry via the position of a firing photodiode in an image sensor 115 array (e.g., the array address). As is discussed herein, due to background noise considerations, embodiments of the present disclosure include photosensitive diodes of the image sensor 115 activated for sensing in a synchronized manner (e.g., "gated") with activation of the interrogation beam 125 for a particular measurement period. A system as described herein is able to provide high throughput via the high sensitivity pixel events, reported according to the pixel address. Further, while embodiments according to the present disclosure provide a means of calculating a distance to an object via a TOF calculation at the pixel level, such information is not necessary for embodiments wherein distance is calculated according to trigonometry information (e.g., triangulation). A positional approach (e.g., pixel address) is able to reduce the cost of a system, by removing the need for expensive circuitry in the pixel to generate TOF information. Further, computation requirements are reduced, as the pixel address may be found via, for example, a lookup table. Additionally, a minimization in circuitry at pixel levels increases the resolution in the system for an array of the same size, because the photon-sensitive portion of each pixel becomes larger as a share of the total pixel (e.g., fill factor increased). Factors such as cost and size are of significant importance for applications such as handheld and/or wearable devices.

FIG. 2 depicts a SPAD pixel architecture 140, according to embodiments of the present disclosure. In an embodiment, enabling the SPAD pixel is implemented by a word line and a bit line signal. The SPAD pixel includes a photodiode 145. The SPAD pixel may include active and/or passive quenching, via active- or resistive-load 220, respectively. The SPAD pixel can include a buffer 225. In an embodiment, active quenching is provided by an active load, the activation of which can be based on feedback (e.g., rising edge trigger of SPAD avalanche current) from an optional feedback quenching circuit 230. Quench time is able to be built into a multiplexer decode switch overhead time. In an embodiment, pixel row and column driven reset is built in, enabling a reset of statistical noise (e.g., DCR, ambient light). In an embodiment, the high voltage supply line is static (e.g., not switched), and the ground-referenced word line enable allows a high voltage current path.

Figure 3:
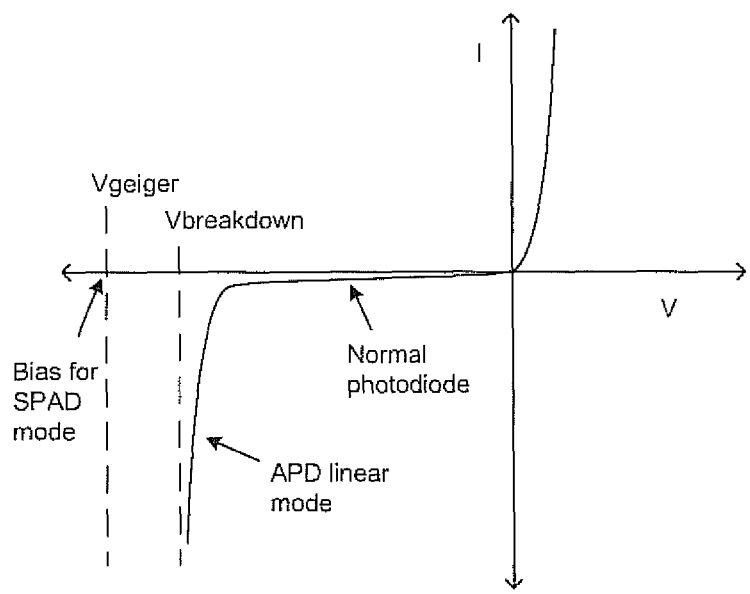
FIG. 3 depicts an exemplary current-voltage relation of a single-photon avalanche photodiode, in accordance with embodiments of the present invention.

FIG. 3 depicts a SPAD current-voltage characteristic 300, according to an embodiment of the present disclosure. The current-voltage characteristic 300 includes arrows indicating phases of SPAD operation. A reverse bias level Vgeiger is depicted, where reverse bias level Vgeiger is a reverse bias voltage beyond the breakdown voltage Vbreakdown of a semiconductor p-n junction, and indicates so-called Geiger mode of an avalanche photodiode (e.g., a SPAD). At voltage level Vgeiger, a SPAD will develop a current (avalanche of electrons) from incident photon radiation, as well as thermal noise. SPAD gain (e.g., electron multiplier factor) is substantially linearly dependent on overvoltage and area of the SPAD cell size. Likewise, the likelihood of photon and/or thermal activation of the SPAD (e.g., DCR) increases with increasing overvoltage. Once avalanche current is initiated, the SPAD is quenched in order to prevent excessive current flow. Once the SPAD is quenched and has returned to a lower voltage bias, in order to prepare the SPAD for further activation, the SPAD voltage bias is returned to Vgeiger. Typical timing values for a SPAD to breakdown (e.g., "fire") are less than 1 nanosecond, while quench and reset are approximately 20-40 nanoseconds. Quenching may be either passive or active, and in a preferred embodiment, active quenching is used to minimize quenching time and thereby increase the rate with which a SPAD generates multiple signals.

Figure 4:
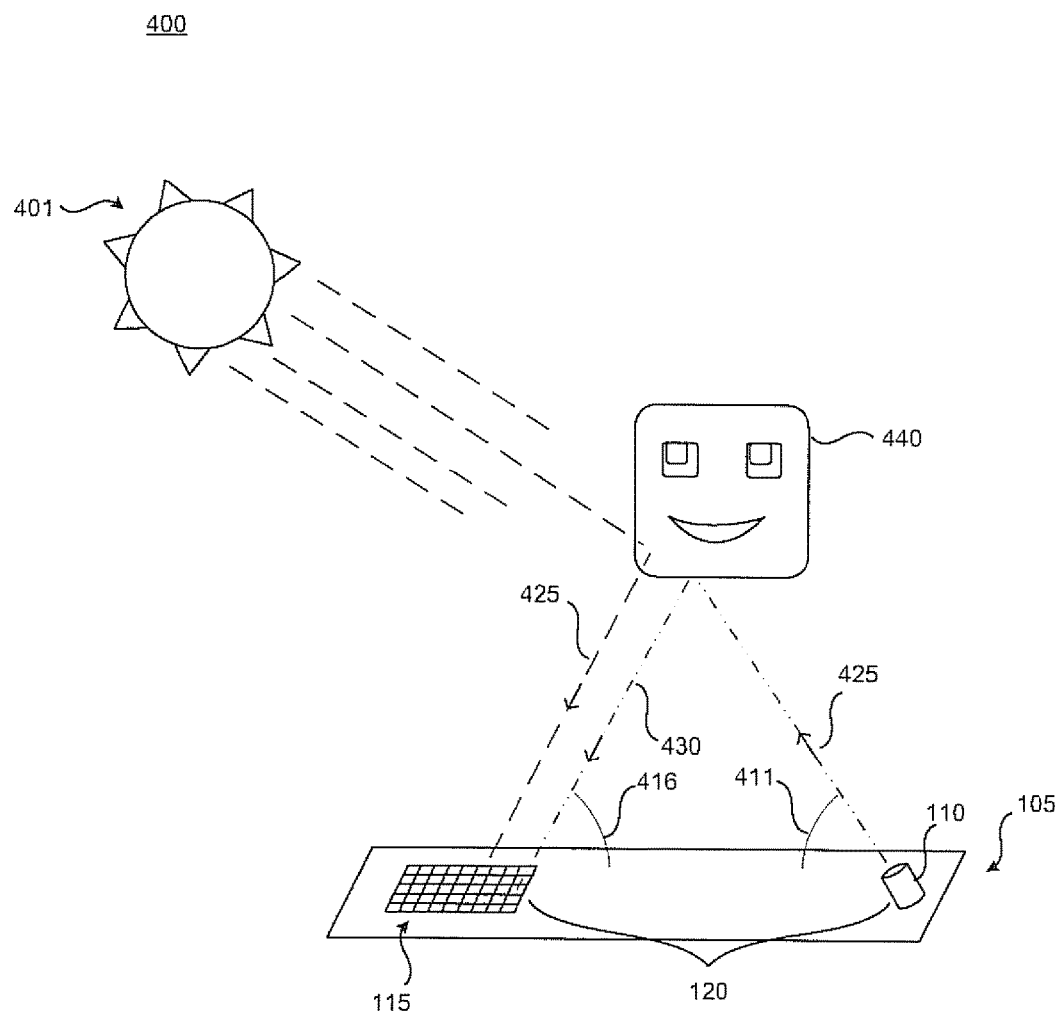
FIG. 4 depicts an exemplary optical interrogation system operating in an environment including a background radiation source, in accordance with embodiments of the present invention.

FIG. 4 depicts a scene 400 including bright illumination, and includes a schematic illustration of an exemplary photonic interrogation device 105 operating to determine a distance to an object 440, with a background radiation source 401 (e.g., the sun) illuminating object 440. Interrogation source 110 emits interrogation beam 425 at angle 411, which is reflected (or backscattered) from object 440 to form returned illumination 430 at angle 416. Returned illumination 430 is received by image sensor 115 (located at distance 120 from image sensor 115), and forms the basis of the distance determination made by photonic interrogation device 105. Concurrent with the illumination beam 425, radiation source 401 is constantly illuminating object 440, with a flux of photons dependent on the output power of the radiation source 401—in the case of the sun, radiation is broad spectrum. Photons from radiation source 401 illuminate object 440, and form reflected illumination 435 which is incident upon the image sensor 115.

The image sensor 115, which comprises highly sensitive photodiodes, does not discriminate photons from the interrogation source 110 from those of the radiation source 401. For an image sensor including avalanche photodiodes operating in Geiger mode (e.g., including SPADs), an individual diode responds to approximately 20 photons. The dark count rate of the SPAD, along with a large photon flux from radiation source 401, will lead to quick firing of a SPAD within image sensor 215, which may be prior to receipt of returned illumination 430 for an object 440 at moderate distance from device 105. Illumination of interrogation source 110 on the object 440 (e.g., the transmit signal), along with the illumination of object 440 by the radiation source 401, e.g., the sun (with optical filtering, the sun's illumination at the wavelength being sensed—e.g., the laser wavelength of interrogation source 110)—give the signal-to-background noise ratio (SNR). It is therefore beneficial to activate photodiodes of image sensor 115 with a timing based on activation of interrogation source 110, in order to improve SNR by minimizing the number of ambient photons incident upon image sensor 115 during measurement, as well as reducing overall DCR contribution to noise at the image sensor 115 by reduced pixel activation time.

Concerning background noise, longer measurement lengths, with corresponding larger TOF, lead to an increase in both ambient photons received and in dark counts. Photons arrive at the image sensor 115 over the entire TOF of the interrogation beam 425. In order to generate a meaningful signal for determining the range to object 440, the returned illumination 430 must impart the requisite number of photons to activate a first enabled photodiode prior to activation by the ambient light and the DCR. Since the interrogation source 110, which is typically a laser, emits a pulse having a finite pulse width, a number of transmission photons expected from the interrogation source 110 is able to be calculated. While photon flux (e.g., rate of photon reception) from radiation source 401 may be steady over time, the photon flux from interrogation source 110 is able to be much higher, depending on output power and duty cycle.

The time window within which a SPAD is active before generating a signal in response to background noise provides a useful time window for pixel activation over one measurement period. Stated another way, an object to be measured (e.g., object 440) will be within such a distance that the TOF of the interrogation beam 425 and returned illumination 430 will not exceed the time within which a SPAD will fire due to background noise. There is a therefore a maximum useful TOF, which corresponds to a maximum range of object distance measurement (light travels at approximately 0.3 meters per nanosecond which, due to the out-and-back nature of the measurement, reduces a maximum range determined by a factor of 2). In measurement scenarios where an approximate range to an interrogation object is known, accumulation of ambient photons (e.g., background noise) may be minimized by coordinating activation of the image sensor 115 with the expected combined TOF of the interrogation beam 425 and returned illumination 430, which is based on the known approximate range to the interrogation object. Stated differently, activation of photodiodes of the image sensor 115 may be TOF-gated, in order to reject ambient photons from ranges in the depth of view outside the expected range to an interrogation object. This TOF need not be directly measured by TOF-specific circuitry, but rather is able to be determined based on distance measurement(s) according to triangulation as described herein.

The pulse window and the pixel window define one distance measurement period. In this manner, interrogation beam angle 411 can be correlated to returned angle 416, which, along with distance 120, provide distance determination to object 440. It is important that received photons at the image sensor 115 are unambiguous, such that photons received at angle 416 are properly attributed to the interrogation source angle 411 from which the photons were emitted. Otherwise, desynchronization may occur between the interrogation beam angle 411 and the receive angle 416, resulting in erroneous distance calculation to object 440. However, the time available for each pixel must be limited by photon budget and distance, as well as total time allowed for each sweep of the interrogation source (e.g., 110) or the image sensor 115 will be subject to firing due to noise, as well as desynchronization of the transmission and reception of the interrogation beam.

As may be appreciated, the function and timing of the image sensor is of particular importance for an optical interrogation system according to the present disclosure. The concept of determining a distance to an object based upon triangulation can be further enhanced by the architecture of the sensor, in order to minimize power consumed by the sensor and the spurious information that an array of highly sensitive avalanche photodiodes might generate due to noise. For example, if a whole array of an image sensor is configured in Geiger mode and enabled, a large portion of the SPADs would fire nearly simultaneously, but perhaps only one (or so) would be due to the interrogation source 110 (e.g., the transmission signal), dependent on the exposure time. Conversely, selective activation of SPADs within the array is able to reduce array-based DCR noise for the image sensor 115 area of interest, and thereby increase the SNR of the optical interrogation device.

Programmable Image Sensor Row & Column Shutter

Figure 5:
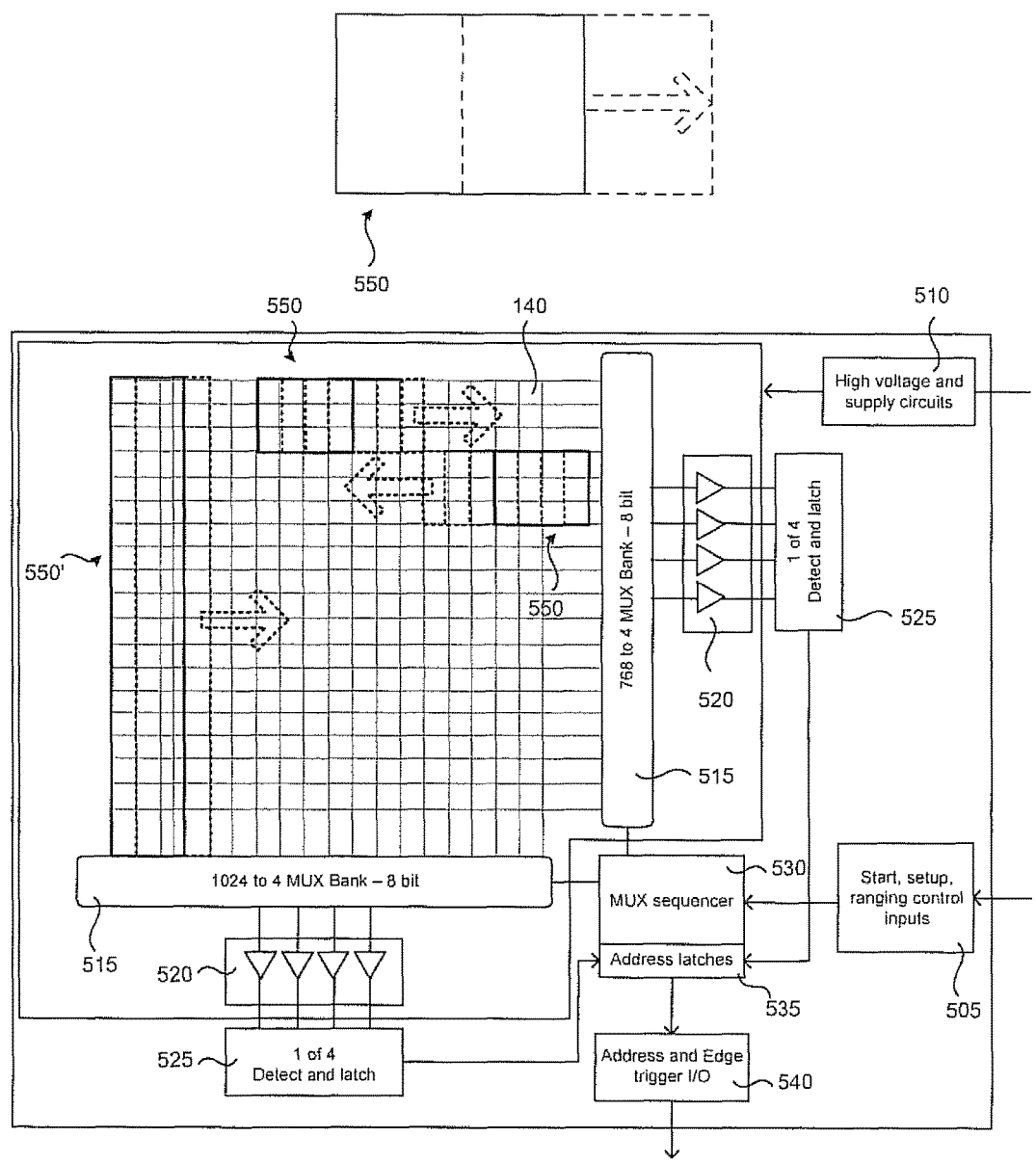
FIG. 5 depicts an exemplary schematic of an image sensor architecture, in accordance with embodiments of the present invention.

FIG. 5 is an illustration of an exemplary image sensor architecture 500, in accordance with embodiments of the present disclosure. The image sensor architecture 500 includes an array of photodiodes 140, start, setup, ranging control inputs 505, high voltage and supply circuits 510, multiplexer banks 515, sense amplifiers 520, detect and latch circuitry 525, multiplexer sequencer 530, address latches 535, and address and edge trigger input/output circuitry 540. The architecture 500 further includes a subset of pixels 550 of the array of pixels in the image sensor, referred to herein as a "sub-array" or "subset of the array" of pixels, the whole array having size R rows and C columns.

With the use of a highly sensitive photodetector in an image sensor (e.g., image sensor 115 of FIG. 1), a low power, high resolution optical interrogation system is able to determine range to an object. Typically, with a small cell size and at IR wavelengths, a SPAD pixel 140 requires receipt of approximately 20 photons in order to fire. In an embodiment, accurate position trigonometry is determined by reporting only the address of a pixel that develops a signal, within a particular time frame (e.g., pixel time frame), based on receipt of photons from an incident interrogation beam reflected from an object of interest. Since the optical interrogation system controls the timing of interrogation source activation (the device controls at what time an outgoing signal is generated), the device is able to be programmed to anticipate approximately over what time period a return signal should arrive (for objects present in a known range, e.g., within a known depth of field).

In order to operate an optical interrogation system at low power, power savings should be realized in as many components as possible (while still maintaining a suitable resolution capability). While the use of highly sensitive SPAD-based pixels reduces the power requirement of the interrogation source, still further gains are able to be made with careful consideration of the manner in which individual SPADs are enabled within the image sensor array. As discussed herein, an avalanche photodiode requires a large reverse bias in order to enter Geiger mode, the initiation of which (via, for example, the high voltage and supply circuits 510) requires a certain power for each individual diode. Further, an avalanche diode in Geiger mode (e.g., a SPAD) is not able to maintain this state indefinitely, but rather will spontaneously fire with elapse of a relatively short time (depending on conditions such as ambient light, cell size, temperature, overvoltage of the diode). Therefore, it may be undesirable to activate all photodiodes in the image sensor array simultaneously, as the likelihood increases of firing events arising from a source other than the interrogation source, as does the power consumed by enablement of photodiodes.

An approach to reduce both power consumed and the probability of pixel activation due to a non-interrogation source event is to activate only a subset of photodiodes in the image sensor during a measurement period. Stated another way, a "page" (e.g., a sub-array 550 of pixels) is activated and enabled to detect an interrogation source transmission during a given time period (e.g., a pixel activation time), and to generate a signal, while other pixels in the image sensor array remain dormant. Activation of a reduced number of photodiodes reduces power consumption, and also reduces the likelihood of spurious spontaneous activation due to background noise (e.g., by removing DCR, ambient light triggering from non-enabled pixels in the array).

For a field of view where no prior knowledge of the location/distance of objects exists, all pixels in the image sensor are optimally enabled in order to provide the greatest opportunity to detect reflected illumination from an object in the field of view. Interrogation of a field of view with some knowledge of prior location/distance of object(s) therein is performed using a sub-array of pixels in the image sensor. A sub-array of pixels can be used because knowledge of expected location/distance to an object in the field of view provides an expected (approximate) location of reflected illumination from that object, at a given interrogation beam angle from the interrogation system. Such a scenario presents a use of the interrogation system's capability of configuring the image sensor to activate only a subset of the pixel array. In conjunction with the optical interrogation system, this may in turn increase the frame rate and reduce power consumption of the interrogation system. This scenario may exist during, for example, an update of a known scene in the field of view (e.g., a field of view that had been measured recently).

The size of the sub-array 550 can be based on a prediction of where photons should arrive, given a knowledge of the volumetric space being measured (e.g., the minimum and maximum distance). The size of the sub-array 550 may need to increase or decrease, due to factors such as the position of objects within the field of view, the power of the interrogation source, the ambient light level, the overvoltage level of individual SPADs, etc. The specific subset of photodiodes active for a particular measurement period is able to change from measurement to measurement (e.g., at the interrogation source is moved to sample different portions of the field of view), thereby generating a "rolling sub-array" of active image sensor photodiodes 550. This is depicted in FIG. 5 by several sets of pixel sub-arrays 550, moving along the sensor array over time as indicated by the dashed arrow. As a non-limiting example, a sub-array 550 is configured using 3 adjacent rows of the image sensor array, and 4 adjacent columns (a 3×4 sub-array size). As another non-limiting example, an array-high sub-array 550' is configured with all rows and several (e.g., 3) adjacent columns active. Sub-array 550' may be used, for example, with interrogation beam 125 configured in fan (e.g., line) mode.

In one aspect, this rolling sub-array 550 may be considered a kind of rolling shutter for the optical interrogation system. The movement of the sub-array 550 is typically incremented at the same rate that a pixel is activated/deactivated for a measurement period—also termed the "pixel rate." As described herein, the pixel rate is determined by factors such as the angular rate (e.g., resonance frequency of a MEMs based scanner mirror) at which an interrogation source moves within the measurement field of view, a mode of the interrogation source (e.g., stepped mode or "fan" mode), the ambient light level, etc. Furthermore, by reporting a pixel event via pixel address only, high throughput of information is able to be attained.

The timing of the pixel sub-array 550 activation with respect to the activation of the optical interrogation source is able to be instituted in several ways. In a synchronous mode, the time between successive pulses of the interrogation source is determined at the optical interrogation system level, by such factors as the ambient light level, the power of the interrogation source, the pulse time, etc., and the sub-array 550 is activated at the same time that a pulse from the interrogation source is fired. Stated differently, the interrogation source and the pixel sub-array 550 are controlled in a synchronized, pulse-by-pulse fashion. Constraints on the period between pulses include the number of photons required to activate an individual photodiode in the subset of pixel sub-array 550, as well as the maximum TOF for determining an object's position (which dictates a maximum range for the detected object). In an embodiment, each pixel completes a sequence of reaching excess reverse bias threshold, maintaining threshold for up to the maximum TOF, firing (if a photon is detected), and quenching, within the time period that one interrogation source pulse is enabled. If the maximum TOF is greater than the pulse period of the interrogation source, then multiple pulses of the interrogation source will be present during the same measurement period of the pixel sub-array 550, leading to distance determination ambiguity. A trigonometric determination of distance requires a unique interrogation source angle, along with a unique receive pixel address. Therefore, minimizing the time required for the SPAD to complete an enablement/firing/reset cycle is beneficial to the operation of the optical interrogation system, as it enables a greater frequency of interrogation source pulses, along with a finer image sensor array resolution. One manner of reducing a SPAD operation cycle is by minimizing the quenching time of the SPAD. This is able to be accomplished via active quenching of the SPAD, whereby an active load is enabled at the time that onset of an avalanche current from the SPAD. In an embodiment, if the TOF exceeds (interrogation source frequency)$^{-1}$, both the interrogation source pulse and the pixel sub-array 550 are incremented and no event is recorded.

An alternative timing of pixel sub-array 550 is asynchronous operation, wherein the interrogation source and the pixel sub-array 550 are simultaneously enabled, but the timing between interrogation source pulses is determined by the timing of detection events. In an embodiment, the interrogation source emits a pulse only when the pixel sub-array 550 receives a return signal (e.g., reflected photons), or when a system time-out occurs. A system time-out is configurable at the system level, and is able to be based upon ambient light level, maximum range to an object, interrogation source pulse power and pulse width, etc. In this manner, a variable or self-timed operation of the optical interrogation system is able to be implemented. For objects located at longer distance (e.g., several meters), the frame rate of the system will be variable. For near objects operation in an asynchronous mode enables a faster interrogation source pulse and pixel sub-array rate, as maximum TOF timeout is not a factor when near objects are present for measurement.

In an embodiment according to the present disclosure, multiplexer banks 515 are coupled to the rows and columns of the image sensor array. In one embodiment, multiplexer banks 515 select outputs according to the current sub-array activated, for example, selecting 3 rows out of 768, 8-bit resolution, and 4 columns out of 1024, 8-bit resolution, corresponding to a current sub-array. Other multiplexer bank configurations are possible. The outputs of the multiplexer banks 515 connect to row- and column-sense amplifiers (or comparators) 520, respectively. In an embodiment, the first photodiode to develop a signal, in any of the rows, will generate a "winner-take-all" detect and latch 525—for example, of 3 active rows, 1 will be output as the detection signal. Likewise, the column corresponding to the signaling photodiode is able to generate a detect and latch 525 output (e.g., 1 of 4). According to embodiments of the present disclosure, the output signal reports only fired pixel locations (e.g., only the addresses of the pixels from the "winner-take-all" detect and latch), and does not include information from other pixels. Other combinations of detect and latch 525 are possible, and are consistent with the spirit and scope of the present disclosure. The combination of the first row address to be activated, and the first column address to be activated, gives a unique pixel address associated with the interrogation source beam enabled during the measurement period. This pixel address comprises the output signal, corresponding to the particular interrogation source angle. For example, the output of the image sensor is 2 bits row information and 2 bits column information, since ranging information is based on a determined sub-array address—therefore, signal management and input/output challenges are able to be significantly reduced compared to conventional ranging systems.

SPAD timing is able to be externally gated in order to reduce noise, although at an expense of system measurement range (e.g., maximum depth of field). For reduced chip size, external timing and control electronics may be used—there is however a tradeoff between design of a printed circuit board (PCB) versus a chip design level. Control input signals are able to be used to generate self-timing, via edge triggering, of programmable setup, pixel enable, and multiplexer sequencing 530. The multiplexer sequencer 530 includes timing and control logic that is triggered from a start signal 505.

Figure 6:
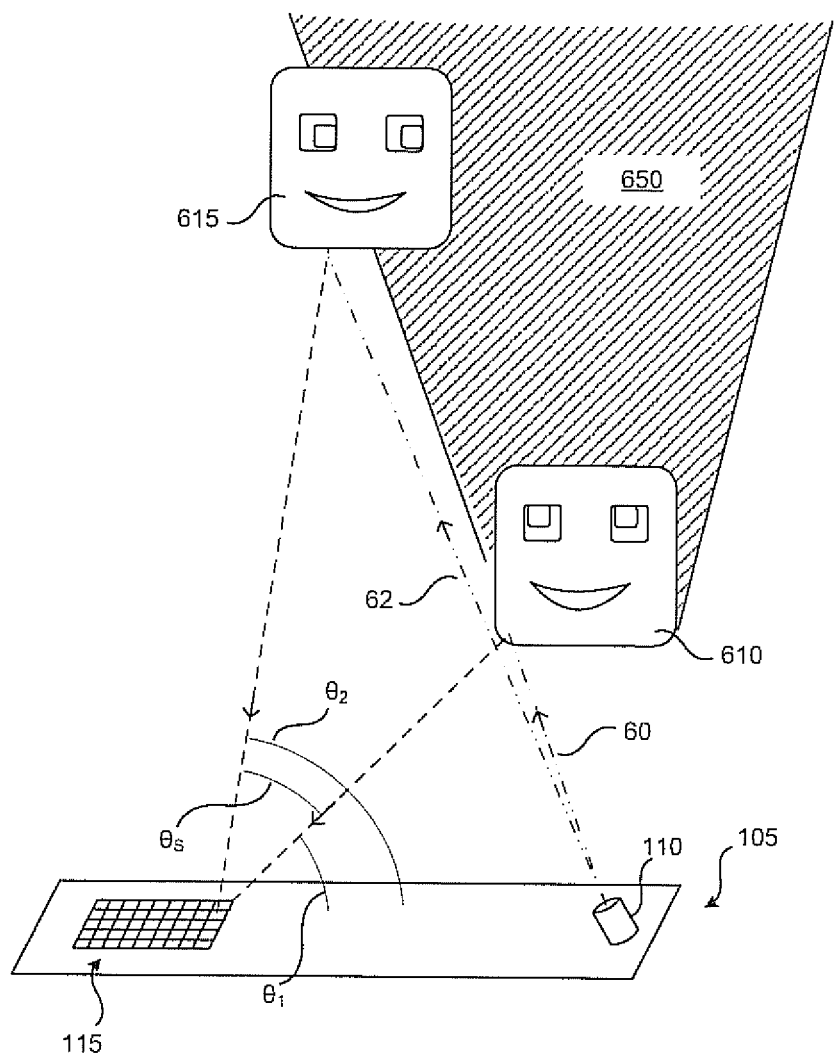
FIG. 6 is an illustration of an environment having multiple objects for distance determination, in accordance with embodiments of the present invention.
Figure 7:
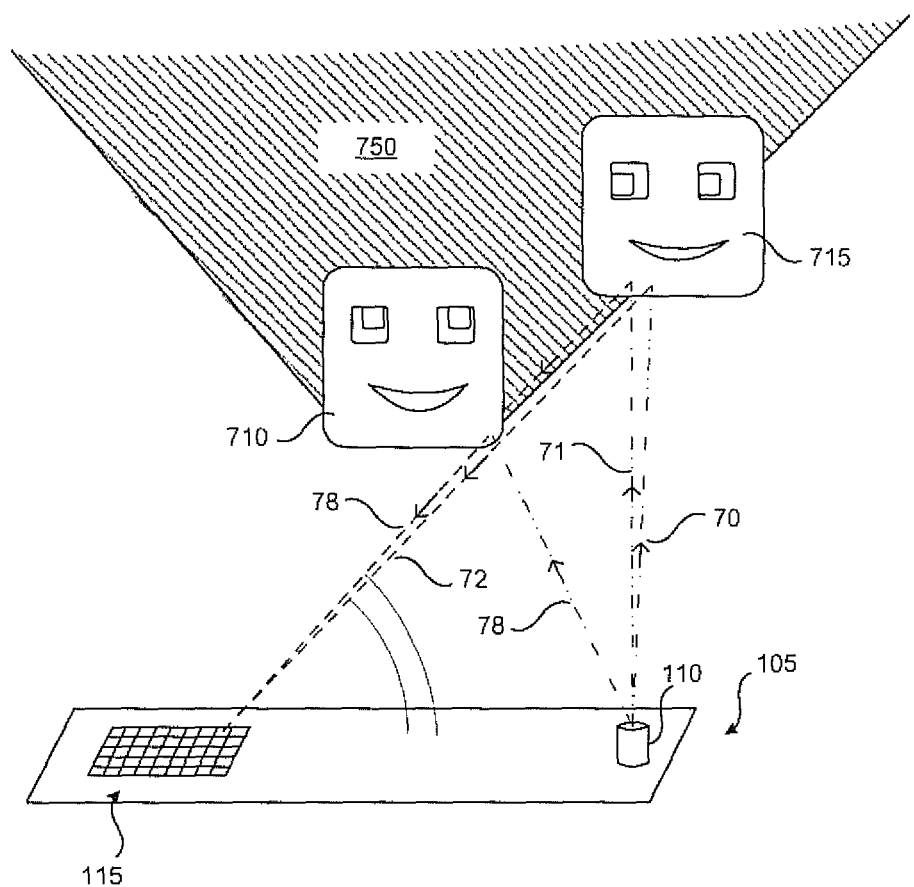
FIG. 7 is an illustration of an environment having multiple objects for distance determination, in accordance with embodiments of the present invention.

During the measurement phase of the optical interrogation system, as the interrogation source is incrementing an angle of transmission of the interrogation beam, the presence of two objects at differing distances from the interrogation system may give rise to a situation wherein a sudden apparent change in object position develops, or alternatively, when an object's presence is not properly detected. FIGS. 6 and 7 illustrate embodiments of one such scenario, wherein a near object obscures at least a portion of a far object.

FIG. 6 illustrates an environment 600, wherein a near object 610 and a far object 615 are measured by optical interrogation device 105. At a first measurement period, an interrogation beam 60 is emitted, which reflects off of near object 610 and is incident on the image sensor at angle $\theta_1$. At a second measurement period following the first measurement period, an interrogation beam 62 is emitted, which is reflected off of far object 615 at angle $\theta_2$. Because the objects 610 and 615 are at different distances, the return angles $\theta_1$ and $\theta_2$ differ, to an extent that depends on the relative distance between the two objects 610 and 615. The implication of these differing return angles, over the course of just one measurement period, is that the returned illumination from the second measurement will be received at an array address several positions removed from the address of the first received signal, leading to an apparent shift in the receive angle, proportional to the distance between objects. This skip angle is denoted $\theta_s$ in FIG. 6. This scenario causes a step function in the position of the object returned by device 105, owing to the distance being determined using triangulation. In general, a region 650 exists wherein objects farther from interrogation device 105 than a near object will not be imaged.

FIG. 7 also depicts an environment 700 having multiple objects for measurement, near object 710 and far object 715. The geometry of the objects 710 and 715 is such that, over a certain range of interrogation beam angles, reflected illumination resulting from incident illumination on far object 715 will be blocked from reception at the device 105 image sensor by near object 710. This situation may be referred to generally as object occlusion. In the example, a first interrogation beam 70 is incident on far object 715, and, narrowly missing object 710, forms reflected beam 72 and is incident on the image sensor of device 105. The following interrogation beam 71 is incident on object 715, but the reflection of 71 is blocked from the view of the image sensor by object 710. This causes failure of the device 105 to measure the distance to those portions of the far object 715 occluded by near object 710. At a later point in the scanning cycle, an interrogation beam 78 is emitted that is incident upon the near object 710, and reflected illumination is received again at the image sensor of interrogation device 105. In general, a region 750 exists wherein objects farther from interrogation device 105 than the object 710 will not be imaged, due to occlusion of the returned illumination.

An approach to account for these sudden jumps in interrogation beam return angle (e.g., of FIGS. 6 and 7) is to enable a larger group of pixels at one time (e.g., to increase a size of a sub-array or page of pixels, e.g., sub-array 550 of FIG. 5). At a greatest extent, this size may be up to half the field of view (in the same dimension of the interrogation beam scan, e.g., along the columns). In this case, the width of the sub-array of pixels may be up to half of the columns. Further, the sub-array of pixels may require some depth in the scan direction orthogonal (e.g., the rows) in order to account for mechanical/optical misalignment between the controlled and actual position of the interrogation source compared to the image sensor, and/or movement of the optical interrogation system with respect to the field of view. Sources of mechanical/optical misalignment in the interrogation source position include MEMs steering and response linearity. These are able to be accounted for by an increase sub-array size of active pixels. The distance determination error induced by misalignment is related to the resolution of the pixel array—a finely resolved array (small pixel size) will have greater returned position error for a given angular misalignment, because a greater number of pixels will be skipped over. While this approach may cause somewhat greater circuit complexity and power consumption for the optical interrogation system, a balance should be sought between the likelihood of missing a returning set of photons from the interrogation beam due to a too small sub-array size (of sampling), against increasing background noise by observing (e.g., enabling pixels over) too large of an area.

The distance between the near and far objects (e.g., object 610 and 615) affects a skip angle—a smaller inter-object distance gives a smaller skip angle, which in turn leads to a reduced sub-array size requirement. In an embodiment according to the present disclosure, a sub-array size adjustment is made automatically, based upon a detected inter-object distance in a field of view of the optical interrogation device (e.g., via a determined skip angle). According to an embodiment, the sub-array 550 size is dynamically adjusted, accounting for changes in a skip angle due to for example, moving objects in the field of view, or to newly introduced objects.

The capability of the optical interrogation device to adjust the activation of subsets of pixels in the sensor array (e.g., pixel sub-array 550 size) provides further functionality. In embodiments of the present disclosure, a frame rate with which the optical interrogation device is outputting frames is adjusted by reducing the number of rows that are activated in the image sensor array during (e.g., a frame zoom). Stated differently, the frame size is decreased by considering fewer than the total possible array rows (e.g., activating fewer than 768 rows in image sensor architecture 500), which leads to a frame rate increase. The frame rate increase will be proportional to the reduction in rows scanned (as the scan time for the columns is maintained, due to the resonant motion of the interrogation source). The full frame is able to be generated by a full scan of the interrogation source, for example, an interrogation source resonant in parallel with an image sensor rows axis and stepped in a parallel axis to image sensor columns. The pulses of the interrogation source pulse activation are able to be limited to those regions contained within the reduced frame region, and likewise a rolling pixel sub-array 550 is able to be active in only the reduced frame region. In an embodiment, the interrogation source is activated in a pulse spot mode, and the stepped motion of the interrogation source is reduced to cover only the rows in the frame zoom region. Operation of the interrogation source and the image sensor in this manner can lead to a reduction in the power consumption of both the interrogation source and the image sensor array. Further, as noted above, the frame rate may be increased, as a particular region in the field of view is zoomed in upon.

A variety of implementations for activating a subset of image sensor photodiodes are possible. As an exemplary alternative to a rolling sub-array of adjacent pixels, a coarse first scan is performed with activation of pixels 8 columns apart, followed by a finer scan with 4 columns apart, and then 2, and so on. In this manner, a coarse estimate of positions of objects disposed within the field of view is ascertained. Refinement of individual positions is able to be made by going coarse-to-fine, thereby enabling fine-tuning of object positions, and also of which interrogation source angles produce "skip" angles. In an embodiment, a calibration mode includes a coarse scan, with large column-gaps of pixels that are active, with subsequent fine-tuning of the column spacing (e.g., number of columns in the column-gaps) and/or the region of scanning (e.g., the rolling sub-array location within the image sensor array). In such a manner, background noise is able to be reduced by setting the logic pulses more accurately with respect to the objects locations in the present field of view—e.g., the logic pulses that enable the pixels on the determined columns to form the reduced rolling sub-array.

In an embodiment, a first scan is made to produce a first frame at maximum resolution, with the location of detected receive signals determining where initial objects are located. Following this initial high frame rate scan, changes are made to which pixels (columns) are active, to exposure delay, to timing, etc. According to embodiments of the present disclosure, these changes are implemented by iterative loops. As a non-limiting example, a determination is made of at what point a signal detection stops (e.g., by continuing to reduce exposure). From this point, the exposure is increased to a point where a signal resumes, which is then correlated to a substantially optimized solution for imaging the object(s) in the present conditions. In this manner, a substantial reduction in background noise is realized, along with an increase in optical interrogation range. Such adjustments are implemented at the system level.

A further technique for increasing frame rate of the image sensor includes an all-row scan mode (e.g., an array-high, swipe of interrogation source light "fan"). In this mode, the pixel page (e.g., sub-array 550) can be an array-high page, with a determined subset of active columns that increment with interrogation source pulses. Frame rate may be substantially increased, with increased system bandwidth requirements, as all of the pixels will be activated with each angular sweep of the interrogation source.

Ranging Via Integrated Time-of-Flight

In an embodiment of the present invention, a single and/or few photon detection array is able to be configured with time-encoded photon firing information per pixel (e.g., pixel 140b), coupled with synchronization interfaces between an interrogation source (i.e. light source) and the detector, in order to allow TOF and ranging information to be obtained. As an example, to achieve 1 cm of free space resolution requires event resolution (i.e. photon travel time from the light source of the interrogation system to the target scene and back to the image sensor of the interrogation system) with an accuracy of approximately 30 picoseconds. The approach described herein is able to be implemented to evolve 3D imaging and ranging systems from high power broadcast or scanning patterns to low power photon bursts (i.e. flashed or pulsed directed laser beams) with highly sensitive photon detector arrays that are designed to yield x-, y-, and z-coordinate information and event time, thus achieving an essentially digital photon detector that reduces post-processing requirements of image data.

As described herein, a SPAD pixel array (e.g., array of photodiodes 140) may be used in combination with a pulsed and/or steered interrogation source (e.g. a laser light source) for 3D imaging and ranging applications. In an embodiment, the interrogation source and the image sensor array are coaxially located through the same optical aperture. Careful alignment should be made of the image sensor and interrogation source, as the highly sensitive SPAD devices will respond to ambient light as well as to the interrogation source. In an embodiment of the present invention, an optical interrogation system comprises a light source operatively coupled to a sensing element. As an example, the light source is a vertical cavity surface emitting laser (VCSEL) and the sensing element may be a SPAD-based pixel contained within an array of photonic pixels. In such a system, the time delay between emission of the light source and detection by a pixel is able to be monitored, the time delay reflecting travel time of at least one photon from the light source to a portion of the scene and back to the sensing element, the travel time corresponding to the distance between the system and a portion of a scene. TOF computation and subsequent readout is able to be integrated into SPAD pixel functionality with the SPAD pixel capable of turning off a charge integrator in such a manner that the pixel stores TOF information (as opposed to, e.g., storage of optical strength information).

Monitoring of the time delay may be performed through different schemes, including, but not limited to, adding charge storage capability to the pixel sensor cell (i.e. control of the charge level of a capacitor). Capacitor charge level is able to then be correlated to time delay, thus providing an estimate of distance from system to scene. In one example, an emission event of the light source is able to trigger discharge of a capacitor and a pixel detection event is able to terminate discharge of the same capacitor. In another example, an emission event of the light source is able to trigger charging of a capacitor and a detection event is able to terminate charging of the same capacitor. In a further example, the laser turn-on edge corresponding to emission of a light pulse from the VCSEL is able to be used to initiate time measurement activity (e.g. charging or discharging of a capacitor). Upon detection of a return photon by the SPAD pixel corresponding to the light source emission, a leading edge of the avalanche current rise is able to be used to trigger an end to the time measurement activity (i.e. charge level change of a capacitor is ceased, thus resulting in a capacitor whose charge is proportional to the time period associated with photon travel). In the case of capacitive charge used as a time measurement means, across the SPAD pixel array, each pixel is able to contain some distance-related amount of charge in the respective storage capacitor, which corresponds to a particular portion of the scene and which is able to be read-out and processed to provide spatio-temporal information of the scene as a whole. Such SPAD pixels are able to be read out in array form similar to techniques used for read out of conventional CMOS image sensor (CIS) pixel arrays.

Such an embodiment provides a high frame rate, while costly MEMs-based beam steering, and other requirements may be circumvented. Further, a shortened and lower level light source illumination may be used due to the heightened sensitivity of the SPAD pixel. It may be recognized that in an embodiment the imaging system may be used with a synchronous and/or steerable photonic interrogation beam (e.g., light source) where the interrogation beam illumination provides a timing reference. In addition, because only a group of pixels within an array will be triggered, local decisions to trigger addressing events are able to be performed. The present embodiment can be extended to the use of a predetermined interrogation pattern from a diffractive optical grating in the interrogation beam with corresponding regions of imaging within a SPAD pixel array (e.g., structured light approaches). Embodiments as described have lower light source power requirements and a capability of producing a direct image to, for example, a processor (e.g., processing unit 902). Thus, imaging sensor embodiments as described are well-suited for integration into a host device such as a mobile device with a host processor.

The pixel array is able to further include a pixel scale microlens array to improve the fill factor of the pixel, that is, to focus incident light upon photosensitive region(s) of the pixel. The pixel array is able to contain sensitivity control (e.g., through reverse bias voltage level control) that can be implemented at the column level, row level, array region level, pixel level, global level, or any combination thereof. Passive and/or active quenching, time gating, use of floating gate programming (e.g. for mismatch calibration and/or pixel decision circuitry) are also able to be implemented.

According to embodiments of the present disclosure, an image sensor has an array of photodiodes including a combination of TOF-enabled and non TOF-enabled pixels (e.g., pixels 140b and 140a). As a non-limiting example, a subset of TOF pixels 140b are arranged in a coarse grid in an image sensor array, with remaining pixels comprising pixels 140a. Such an arrangement can be used to simplify, or to augment, control system logic for addressing pixels in the array (e.g., for generating moving sub-array 550). Using control of input signal from the interrogation source, a coarse-grid calibration is able to be made using TOF information from the TOF pixels 140b, augmented by a high resolution scan using pixels 140a of the image sensor array. A variety of control schemes are possible, which are able to provide greater precision and/or quicker windowing for the image sensor array. Further, TOF pixels 140b are able to be used, periodically, to assist in noise rejection for the optical interrogation device (e.g., by providing a direct TOF measurement to an object).

Figure 8:
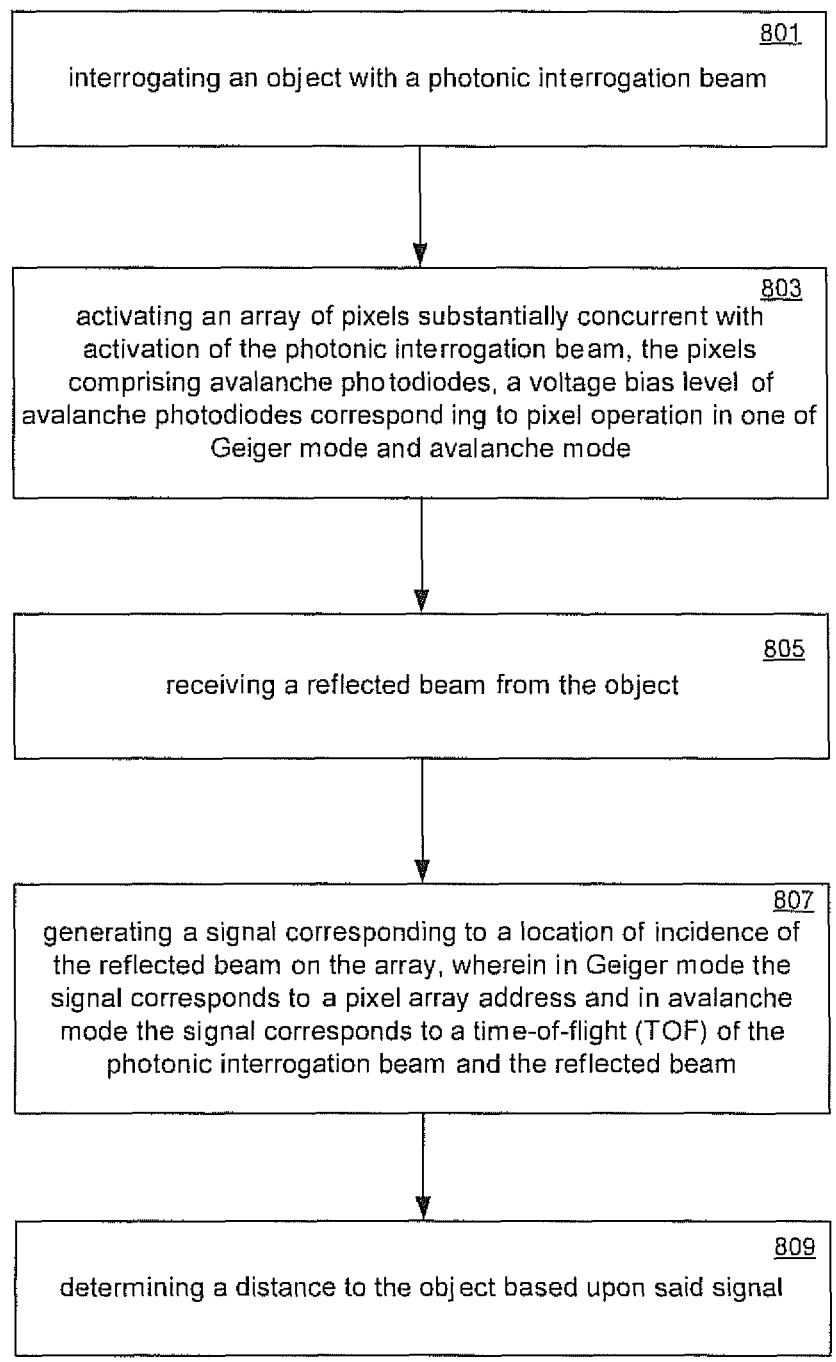
FIG. 8 is a flowchart illustrating a method of determining a distance to an object, in accordance with embodiments of the present invention.

FIG. 8 is a flowchart 800 of a method determining a distance to an object using an interrogation beam, in accordance with an embodiment of the present disclosure. Steps 801-809 describe exemplary steps comprising the process depicted in flowchart 800 in accordance with the various embodiments herein described. In one embodiment, the flowchart 800 is able to be implemented as computer-executable instructions stored in a computer-readable medium and performed by a computing device executing a process for determining a distance to an object.

At step 801 an object is interrogated with a photonic interrogation beam. The interrogation beam is able to be for example interrogation beam 125, from interrogation source 110 of optical interrogation device 105. In an embodiment, interrogation source is a laser having a resonant MEMs scanning mirror (e.g., a vertical cavity surface-emitting laser (VCSEL). The interrogation source is able to emit radiation at an IR wavelength, or at other wavelengths. In an embodiment, the mirror is resonant in the x direction (e.g., along image sensor array columns), and stepped in the y-direction (e.g., incremented along image sensor array rows). A resonant scanning mirror is able to be used to sweep an interrogation beam 125 across a field of view for the interrogation device 105, and thereby interrogate an object in the field of view. In an embodiment a laser operates in a "spot" mode; alternatively, a laser interrogation source operates in a "fan" mode, emitting a broad stripe of illumination.

At step 803 an array of avalanche photodiodes (e.g., array of SPAD photodiodes) is activated, the avalanche photodiodes operating in Geiger mode, the activation occurring substantially concurrent with activation of the photonic interrogation beam. In an embodiment, only a subset of the array is activated during a pulse of the interrogation source. In an embodiment, the subset of the array changes in a time-varying manner, and is incremented in concert with successive pulses of the interrogation beam (e.g., rolling sub-array 550). The size of the sub-array is able to be altered, and can be based upon interrogation source intensity and rate of movement, and the range to objects in the field of view, among other factors.

At step 805 a reflected beam is received from the object (e.g., beam 130, received at image sensor 115). An optical system (e.g., optical system 135) may be included in the image sensor. The optical device is able to focus and/or filter incident reflection onto the image sensor. In an embodiment, deactivating the array occurs substantially concurrent with reception of the reflected beam, following generating the signal at step 807.

At step 807 a signal is generated, corresponding to a characteristic of the reflected beam. In an embodiment, generating the signal is based on the receiving the reflected beam by a first array element comprised by an active subset of the plurality of subsets, and any detection of the reflected beam by a remainder of array elements in the array by the active subset is not included in the signal. In an embodiment, each photodiode of the array of avalanche photodiodes includes at least one charge storage element, and activating the array terminates a changing charge level of the at least one charge storage element during a time period between an emission from the interrogation beam and the receiving the reflected beam from the object. In an embodiment, the storage element is a capacitor, and the charge level is comprised by the signal and provides a measure of the time between an interrogation source emission and reception of reflected illumination (e.g., TOF information).

At step 809, a distance is determined to the object based upon the signal. In an embodiment, the angle that the returned light comes into the optics (e.g., angle 116) determines the column of the image sensor array having photodiode activation (e.g., the position within the row). This pixel address, along with an optical interrogation source angle (e.g., 111), provides an estimate of returned light angle 116, and together with the distance between the interrogation source and the image sensor, these provide a distance determination (via triangulation). In an embodiment, a TOF computation and subsequent readout is integrated into SPAD pixel functionality (e.g., pixel 150b), and the SPAD pixel toggles operation of an integral charge integrator in such a manner that the pixel stores TOF information.

Exemplary Ranging Device

An optical interrogation device according to the present disclosure may include various configurations and may be used in a host electronic device employing an optical interrogation device. Such electronic devices include but are not limited to wearable devices and other portable and non-portable computing devices, such as glasses, watches, cellular phones, smart phones, tablets, and laptops. As presented in FIG. 9, an exemplary host device upon which embodiments of the present invention may be implemented includes a general purpose computing system environment 900. The host device includes an optical interrogation system 907. According to an embodiment, the optical interrogation system 907 comprises: an interrogation source on the system (e.g., interrogation source 110) that illuminates a target scene (e.g., with laser light) during image capture; a single and/or few photon pixel array image sensor (e.g., image sensor 115) located on the system at a controlled location (e.g., horizontally offset from the interrogation source 110); and circuitry within the image sensor that converts an optical image of a target scene into an electronic signal for image processing. The optical interrogation system 907 optionally comprises an imaging lens and/or micro-lens array, and/or a filter (e.g. an optical wavelength bandpass filter) to reject ambient light during image capture.

In its most basic configuration, the computing system 900 may include at least one processor 902 and at least one memory 904. The processor 902 generally represents any type or form of processing unit capable of processing data or interpreting and executing instructions. In certain embodiments, the processor 902 may receive instructions from a software application or module. These instructions may cause the processor 902 to perform the functions of one or more of the example embodiments described and/or illustrated herein. According to embodiments of the present disclosure, the processor 902 is configured to receive images of a target scene from the image sensor, and to estimate distance information of the target scene from the image.

The memory 904 generally represents any type or form of volatile or non-volatile storage device or medium capable of storing data and/or other computer-readable instructions. In certain embodiments the computing system 900 may include both a volatile memory unit (such as, for example, the memory 904) and a non-volatile storage device 908. The computing system 900 also includes a display device 906 that is operatively coupled to the processor 902. The display device 906 is generally configured to display a graphical user interface (GUI) that provides an easy to use interface between a user and the computing system.

In an embodiment, computer system 900 comprises instructions for performing processes according to aspects of the present disclosure, where the instructions may be stored on memory 904, or storage 908. For example, the computer system 900 may comprise object distance determination instructions 913, where object distance determination instructions 913 contain instructions causing computer system 900 to perform a process of determining a distance to an object according to embodiments of the present disclosure (e.g., process 800).

Figure 9:
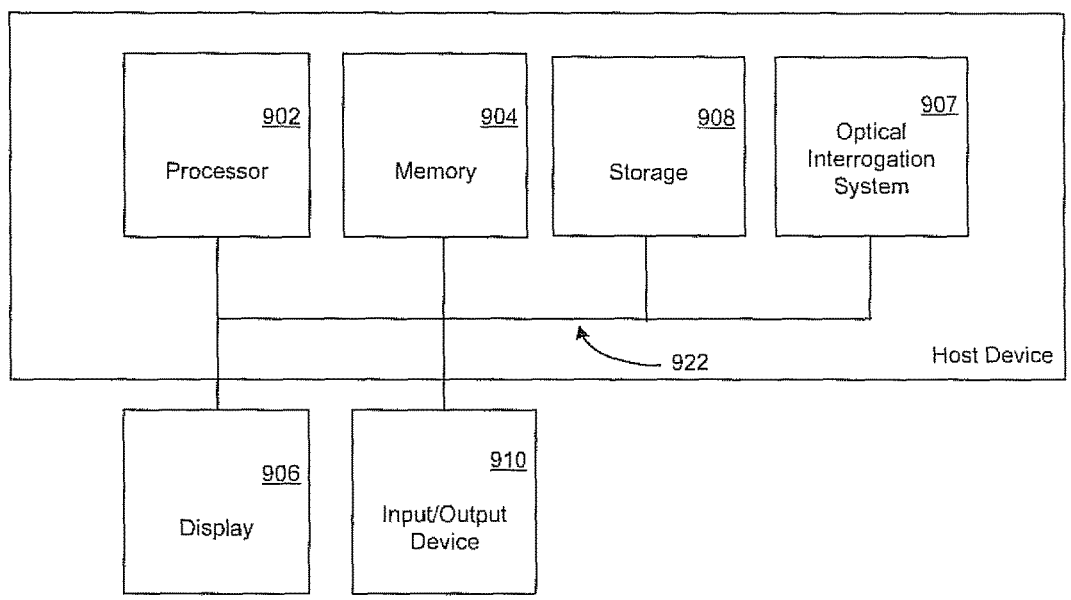
FIG. 9 depicts an exemplary optical interrogation system integrated with a host device, in accordance with embodiments of the present invention.

As illustrated in FIG. 9, the computing system 900 may also include at least one input/output (I/O) device 910. The I/O device 910 generally represents any type or form of input device capable of providing/receiving input or output, either computer- or human-generated, to/from the computing system 900. Examples of an I/O device 910 include, without limitation, a pointing or cursor control device (e.g., a touch-sensitive device and/or mouse), a speech recognition device, a keyboard, or any other input device.

The communication interface 922 of FIG. 9 broadly represents any type or form of communication device or adapter capable of facilitating communication between the example computing system 900 and one or more additional devices. For example, the communication interface 922 may facilitate communication between the computing system 900 and a private or public network including additional host devices and/or computing systems. Examples of a communication interface 922 include, without limitation, a wireless network interface (such as a wireless network interface card, and/or a Bluetooth adapter), a wired network interface (such as a network interface card), a modem, and any other suitable interface. In one embodiment, the communication interface 922 provides a direct connection to a remote server via a direct link to a network, such as a cellular network and/or the Internet. The communication interface 922 may also indirectly provide such a connection through any other suitable connection. The communication interface 922 may also represent a host adapter configured to facilitate communication between the computing system 900 and one or more additional network or storage devices via an external bus or communications channel.

Pixel Circuitry

Figure 10:
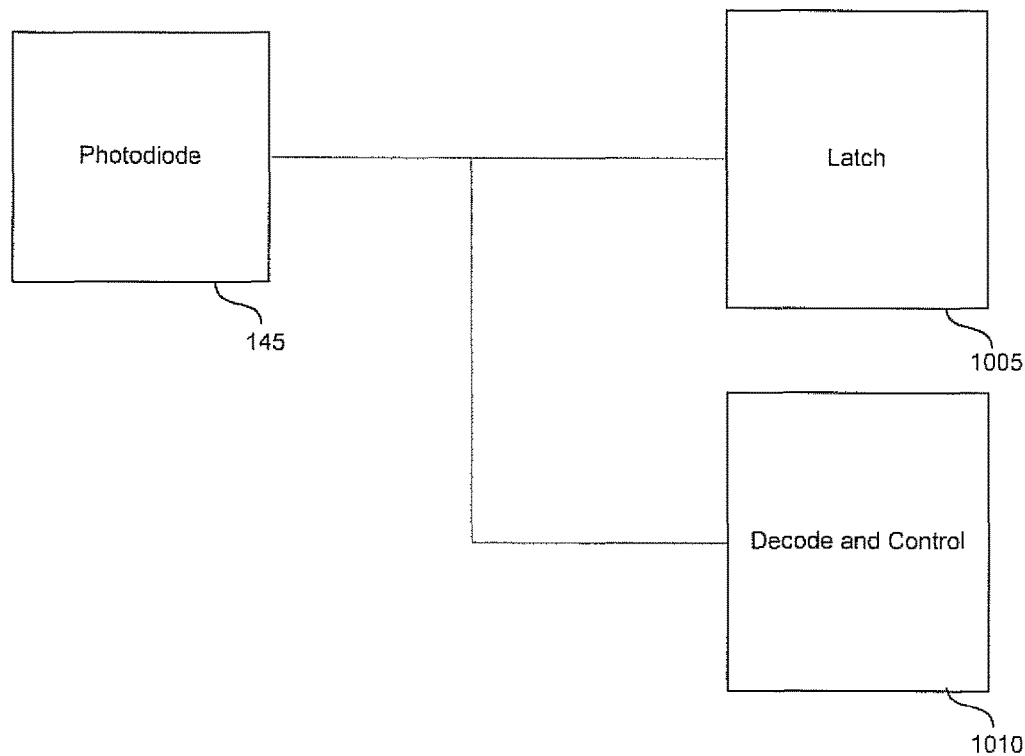
FIG. 10 depicts a block diagram of exemplary pixel circuitry in accordance with embodiments of the present invention.

FIG. 10 depicts a block diagram of exemplary pixel circuitry 1000 in accordance with embodiments of the present invention. The exemplary pixel circuitry 1000 includes a photodiode 145, a latch circuit 1005, and decode and control circuitry 1010. The photodiode 145 generates a current pulse upon receipt of illumination, which can be translated into a voltage pulse by an electrically coupled resistor (e.g., 220 of FIG. 2). The voltage pulse may be used directly for logic by the pixel circuitry 1000, for example enabling direct utilization of a photodiode activation event (e.g., firing) to set a latch at the latch circuitry 1005.

Figure 11:
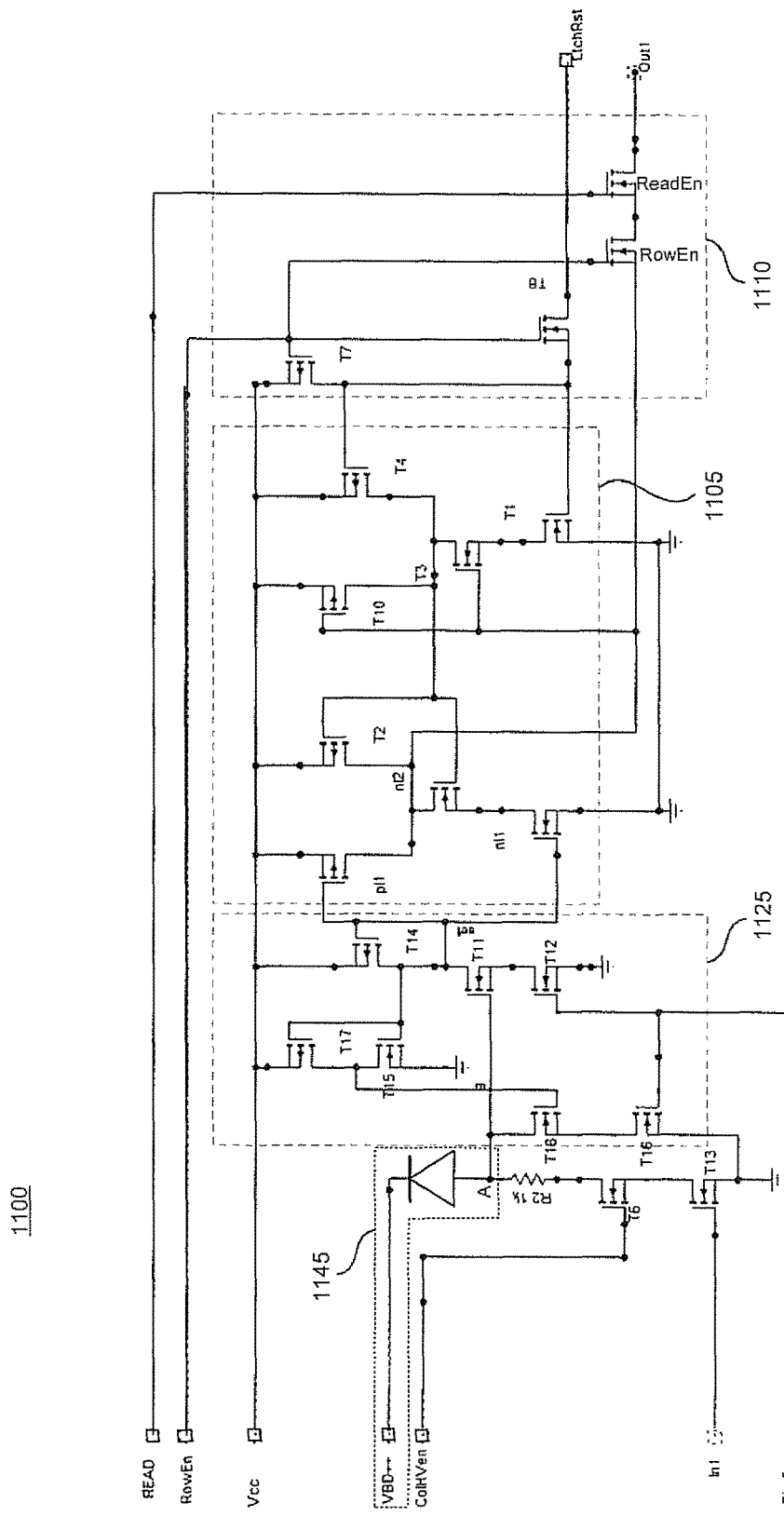
FIG. 11 depicts an exemplary pixel circuit, in accordance with embodiments of the present invention.

FIG. 11 depicts an exemplary transistor level schematic pixel circuit 1100 according to an embodiment of the present disclosure. The pixel circuit 1100 includes buffering elements 1125 (e.g., corresponding to buffer 225 of FIG. 2), latch elements 1105 (e.g., corresponding to latch 1005), and decode and control elements 1110 (e.g., corresponding to decode and control 1010). The pixel circuit of FIG. 11 is gated by column and row enable signals (ColHVen and RowEn), and has a ground-referenced photodiode. In an embodiment, a photodiode is configured to operate in Geiger mode (e.g., operate as a SPAD). The ground-referenced photodiode, upon receipt of sufficient photon illumination (e.g., several photons) generates a rapid current pulse that is translated, via a resistor, into a voltage pulse. The voltage pulse may be used directly for logic by the pixel circuitry, thereby enabling direct utilization of a photodiode activation event (e.g., firing) to control functionality of the image sensor. For example, the voltage pulse may be a positive pulse (relative to ground) that is used as input for a transistor. According to embodiments of the present disclosure, the voltage pulse generated from the photodiode event is able to develop a logic level voltage which may be, for example, input directly into CMOS logic in order to set (or reset) the set-reset latch circuit of elements 1105.

According to embodiments of the present disclosure an image sensor (e.g., image sensor 115) comprises an array of pixel circuits 1100, and a set value for the latch 1105 is able to cause the image sensor array to report the address of the fired pixel, which can be used to determine a return angle of an interrogation beam reflected from an object. As described herein, with a determined return angle (e.g., angle 116 of FIG. 1) distance to an object via is able to be found via triangulation. As a non-limiting example, a positive voltage spike can be inverted by a source follower to provide a negative voltage spike relative to Vcc, which can be a set signal to a set-reset latch. The pixel architecture according to FIG. 11 does not require high gain analog sense amplifiers or analog time-to-digital converters, which enables a decrease in both power requirements and measurement latency for the system due to the lack of analog components. The pixel architecture 1100 according to FIG. 11 is a completely digital pixel.

According to embodiments of the present disclosure, the photodiode is actively quenched in order to control the time period between potential successive firings of the photodiode (e.g., in order to minimize the reset time of a SPAD after a firing event). Conversely, in many other approaches the position of a resistor is at the top of the photodiode, and the photodiode is anchored at ground. Such an architecture results in a negative pulse when a SPAD fires from a photon detection event, which is less useful for a system that is designed to directly utilize a photodiode activation event as a direct input for CMOS logic. Conventionally, a SPAD may be AC-coupled (e.g., a photodiode coupled with a capacitor) to perform level shifting in a passive circuit. Such architectures are substantially slower than those of the present disclosure, and do not allow active quenching or gating of a pixel. Further, sense amplifiers used to sense a small current are not required in architectures according to the present disclosure.

According to an embodiment of the present disclosure the pixel circuit 1100 is gated (e.g., the photodiode is selectively activated). In a quiescent state, the photodiode is ungrounded and there is no voltage across the photodiode, and thus the photodiode is unable to fire even in the event of incident photons. According to embodiments herein, the photodiode is powered separately from logic circuitry (such as the latch) by a high voltage rail. High voltage components of the pixel circuit 1100 are limited to those elements within box 1145, namely, the high voltage supply line, the photodiode cathode, and junction A (e.g., interconnection with the anode of the photodiode). When the pixel is enabled—by control lines (e.g., ColHVen and RowEn) controlled at the system level—photons incident at the photodiode may generate a signal (e.g., a current pulse from an avalanche breakdown event) that leads to a voltage pulse. As shown in FIG. 11, a firing pulse may be generated at a node B only when FireEn, ColHVen, and RowEn are at a high level. This architecture provides complete pixel gating control, and therefore control over the set of pixels in the image sensor array that are enabled for each particular measurement period (e.g., specific, general-purpose pixel control for variable pixel page size). In an embodiment a voltage clamp is used in buffering elements 1125 to limit the voltage spike at the gate during a firing event of the photodiode. Further, through limiting the voltage spike, the voltage clamp serves to maintain a voltage level of the photodiode that is closer to the target photodiode bias level, and thereby reduces the time required to reset the photodiode to a state of readiness for a subsequent firing event.

In this manner the pixel is gated, and the (enabled) ground-reference photodiode is able to set a latch upon a firing event. According to an embodiment, RowEn allows HV image sensor column control in an HV mode, and column access in Read mode. HV bias across the diode may be addressable by row and column, while a READ signal prevents column contention in HV mode. According to an embodiment, read is addressable by ROW, and columns are sampled for firing event information from the image sensor array photodiodes. Further control logic enables a global reset of the latch (e.g., for a later ranging measurement)—a latch reset signal LtchRst is enabled by a low pulse, and is applied to the active row(s) in order to reset the photodiode(s).

The pixel architecture as presented in FIG. 11 enables a fast, power efficient, serial self-sequencing readout of fired pixels for an image sensor architecture. According to an embodiment of the present disclosure, a pixel latches with a firing event responsive to receipt of illumination reflected from an object that has been interrogated by an interrogation source of a ranging system. This latch enables a readout of the address of the pixel that has fired, which, along with knowledge of the interrogation system (e.g., the angle of the interrogation beam, the distance between the interrogation source and the image sensor), provides information needed to determine a distance to an interrogated object.

Figure 12:
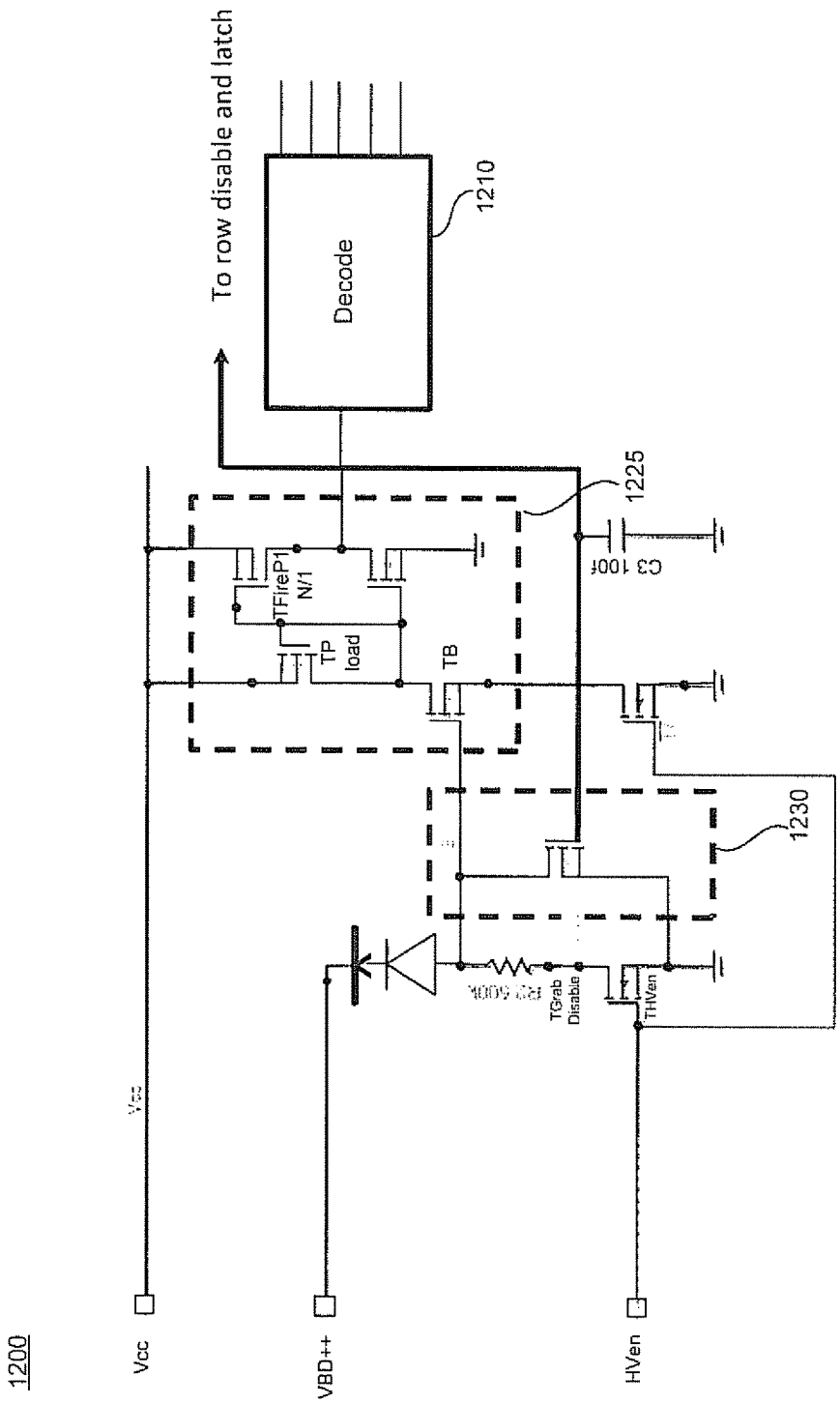
FIG. 12 depicts an exemplary pixel circuit including buffer and decoder elements, in accordance with embodiments of the present invention.

Referring now to FIG. 12, an exemplary pixel circuit 1200 including buffer 1225 and decoder elements 1210 is depicted. The pixel circuit 1200 can further include quench feedback circuitry 1230. According to an embodiment, the pixel circuit 1200 is operable to generate a column address value when a pixel of image sensor array 115 is activated based on received illumination. The column address from decode circuit 1210 can be used to set a row latch at the end of the row in which the pixel resides. Further, activations of the pixel can forward a disable signal to other pixels (e.g., other pixel circuits 1200) on the same row (e.g., those corresponding to other columns of the row), and in this manner signal contention can be minimized. That is, a first column activated on the row sets a latch, stored outside the image sensor array 115, and also disables other pixels of the row. Pixel circuit 1200 is well suited to image sensor architectures interrogating in a fan mode (e.g., line scan mode), for example, the image sensor architecture described for FIG. 16.

Figure 13:
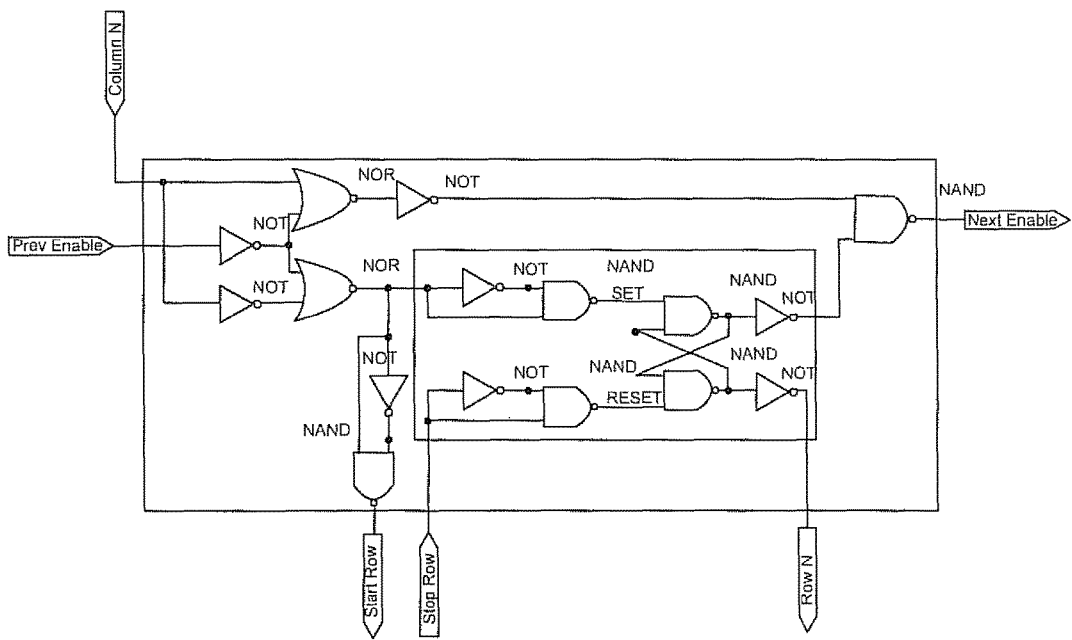
FIG. 13 depicts exemplary circuit logic for image sensor column self-timing and readout ripple-through functionality, in accordance with embodiments of the present invention.

FIG. 13 depicts an embodiment of circuit logic for image sensor column self-timing enablement, as well as readout ripple-through functionality, based upon a pixel architecture such as that described for FIG. 11. According to embodiments of the present disclosure, circuit logic is able to receive a signal directly from the photodiode (e.g., a SPAD firing event), and thereby to (rapidly) set a latch. A first firing event at a pixel in the image sensor is able to cause other pixels to deactivate. As a non-limiting example, once one latch has been set on a row in the image sensor, all other pixels on the row are disabled via a self-timing loop. This architecture enables a precise determination of the location of incident photons at the image sensor array. With this information a distance determination may be made, as described via embodiments herein. While a potential exists for adjacent pixels to develop a signal (e.g., for adjacent photodiodes to fire), this potential may be mediated substantially by careful control of timing for illumination from the interrogation source as described herein, as well as, or along with, image sensor activation timing (e.g., pixel sub-array gating).

In an embodiment, SPAD-based pixels contain a self-timed latch that is used to drive readout circuitry, reduce power consumption, and prevent an event pile-up mode that is associated with using single photon detectors in high photon count environments. System level timing commands (e.g., column- and row-enable signals) may be used to trigger self-timed asynchronous logic, at the pixel level. According to embodiments of the present disclosure, the system level timing synchronizes activation of an interrogation source with activation of one or more pixels in the image sensor (e.g., a pixel sub-array, which is able to vary in size from one pixel up to the full image sensor array). Once a column enable is set, a timing loop is triggered for a pixel through a set-reset latch. If no photodiode activation is detected, the latch is not set, and the next enable path is activated to continue the image sensor readout at the next pixel on the enabled row (e.g., the pixel at the adjacent column). The next column is prevented from being read until the current pixel has completed its readout cycle. Pixels report sequentially in the image sensor with a self-timed readout period. In particular, only those pixels that experience an activation event (e.g., a SPAD firing), and therefore set a latch, are the pixels that report for a given associated interrogation pulse. Stated another way, the only readout report from the image array is the address of the first pixel to set a latch, and further pixel reporting is prevented by not enabling the sequential pixels during readout (e.g., a readout of a following pixel is enabled only if the present pixel does not set a latch). Unset pixel addresses are therefore sequentially skipped during readout by asynchronous feed-through logic (e.g., ripple-through), with readout occurring more quickly and with lower data bandwidth requirements than conventional systems, as only the address of the first pixel fired on a particular row (or column, for column-by-column readout configuration) is reported.

Figure 14:
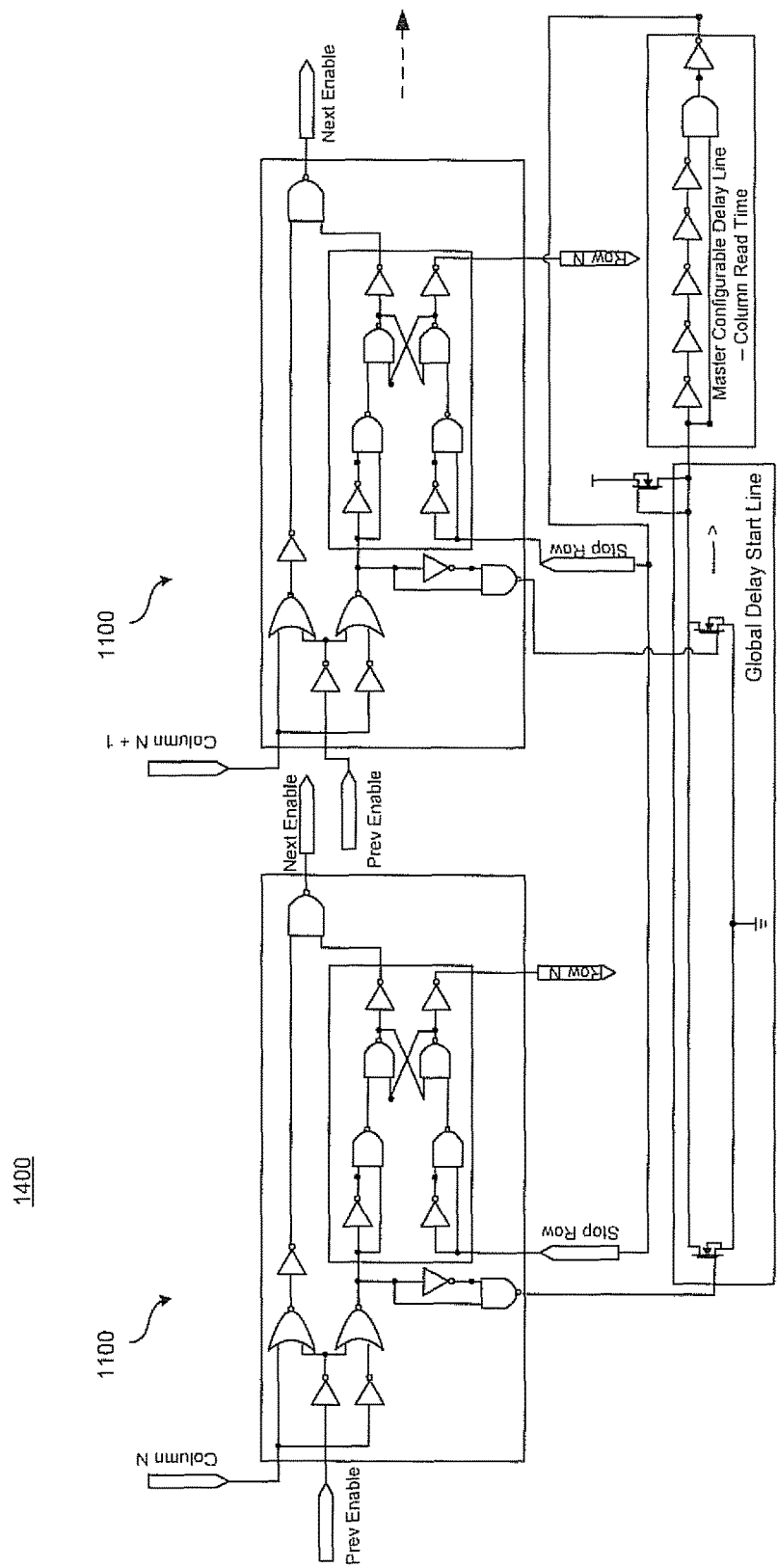
FIG. 14 depicts a block diagram of connected pixel circuitry, in accordance with embodiments of the present invention.

FIG. 14 depicts a block diagram 1400 of connected read logic circuitry according to an embodiment of the present disclosure (e.g., side-by-side logic circuitry, with global timing circuitry). The logic circuitry includes column bypass logic along with an external timing pulse generator for column enablement. The timing is configured such that a readout of a current column state may be made, with a next column enablement and readout according to similar logic.

The particular timing is configured at the system level, and may be adapted according to imaging conditions (e.g., ambient light level, interrogation source power, estimated distance to an imaged object, etc.). According to embodiments of the present disclosure, all columns are input when a photodiode Read Row is set. In one aspect, ripple-through logic is enabled when a column has a low value (e.g., a photodiode is off). As the readout progresses sequentially through the array, the first column returning a high value halts the ripple-through logic, and a value is able to be set corresponding to the high value of the column. In an embodiment, the column high value sets a ROM row to a high value, until a timer resets and a Next Enable is set. This process is repeated in the next (e.g., sequential) column, until the final column in the array is reached. Those ROM Rows having photodiodes that have been set (e.g., from a column high value) are read out at the image sensor input/output circuitry. The readout ripple-through logic is able to be implemented in several image sensor embodiments, including the embodiments described below for FIGS. 15 and 16, where the ripple-through logic is used during readout of ROM column address, or row column registers, respectively.

Image Sensor Architecture

Figure 15:
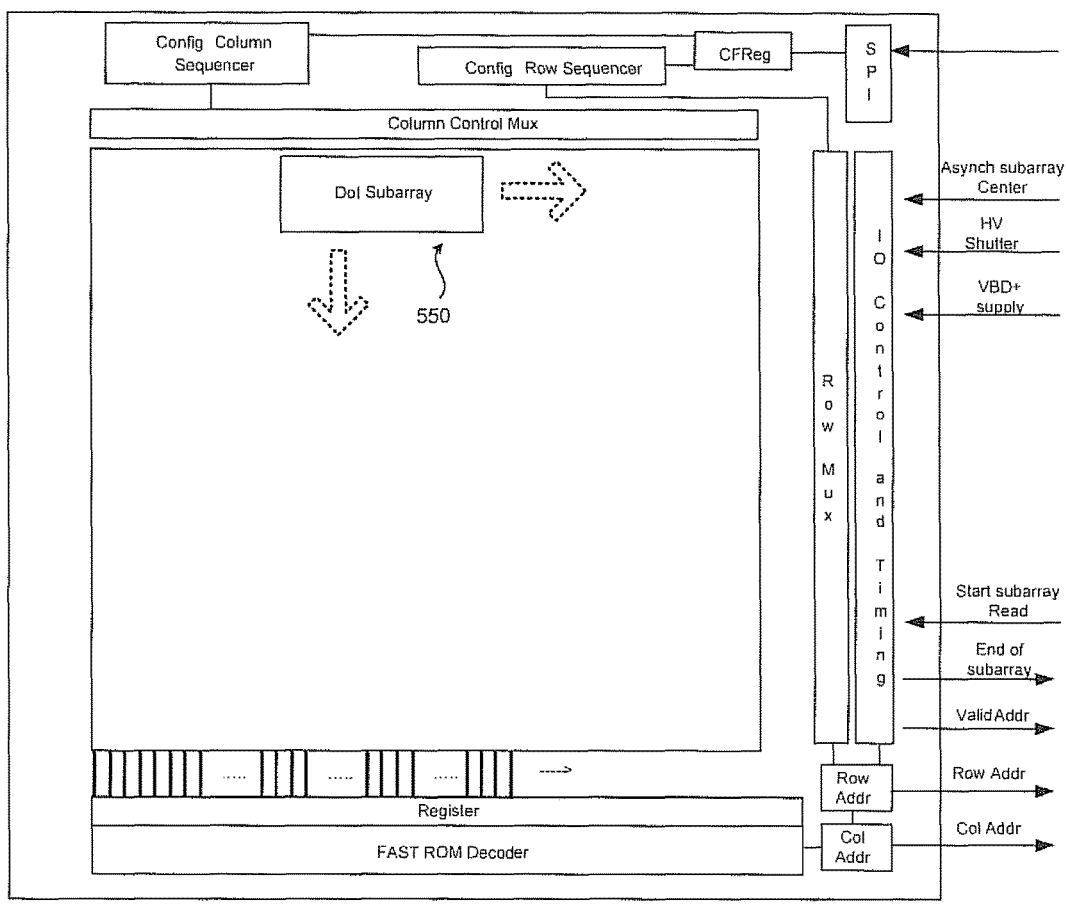
FIG. 15 depicts a schematic of an image sensor architecture, in accordance with embodiments of the present invention.

FIG. 15 is a schematic of an image sensor architecture 1500 according to an embodiment of the present disclosure. The image sensor architecture 1500 includes an array of photodiodes, a serial programmable interface (SPI), a column control mux, a row mux, input/output control and timing circuitry, a fast ROM decoder, and configuration circuitry for row- and column sequencers. Each pixel of the image sensor array is gated and self-latching, as described herein (e.g., FIGS. 10 and 11). In one aspect, the image sensor is a self-reporting pixel sequencer, having a pre-programmed sub-array size 550 (up to the full image sensor array). The pixel is digital in nature and has a value of either 1 or 0, corresponding to a latch that has or has not been set, respectively, during a distance measurement period. The image sensor array is divided into user-configurable pages, which are able to be incremented sequentially as the angle of the interrogation beam is varied, and/or the addresses of activated pixels are able to be coordinated with the interrogation beam transmit location in 3D space. The latter allows simultaneous read of an exposed sub-array of pixels while exposing a geometrically separated sub-array, which can increase frame rate and throughput, and is able to be configured at the system level.

The control logic (e.g., FIGS. 13-14) at the front end of the ROM decoder enables a pixel, when set by a photodiode activation, to drive onto the fast ROM decoder—all other pixels being off at that time. According to embodiments of the present disclosure an output of the image sensor array is a row driver signal into a fast ROM decoder, the signal corresponding to a column of the image sensor having a firing event, the ROM decoder having, for example, a lookup table containing the address of the activated column for image sensor location determination. The current enabled row is known (as it is controlled by the imaging system), and the column location determined by the ROM decoder provides the unique address of the photodiode that has been activated. In this manner, the image sensor architecture 1500 latches an activation event at the pixel, and decodes the location at the column (via the fast ROM decoder). All of the rows of the image sensor are inputs to the fast ROM decoder, where pixels include logic as described according to embodiments herein. An image sensor architecture according to the present invention outputs only the array address of a pixel that is activated during a measurement period (e.g., by a SPAD firing event), and all further unread pixels on the row are deactivated and skipped over, thereby minimizing both the opportunity for firing due to a noise event (e.g., exposure to ambient light) and the bandwidth requirement of data transmission.

High-level (e.g., system level) timing commands are used for synchronizing illumination light pulses from the interrogation source with the image sensor activation of pixels. The timing commands are used to trigger self-timed readout in the image sensor, which drives the sequential reporting of only those pixels which have fired in the associated light pulse period (e.g., the pixels operate as asynchronous state machines). After all rows have been read, a global reset (controlled at the system level) resets all of the pixels in the image sensor for the next interrogation beam pulse (e.g., next measurement period). The row read mechanism uses the aforementioned pass-through logic functionality, for each row, to report only activated pixels (rows). Alternatively, a register bank can be used to latch a row scan, with readout occurring at a subsequent row scan.

Figure 16:
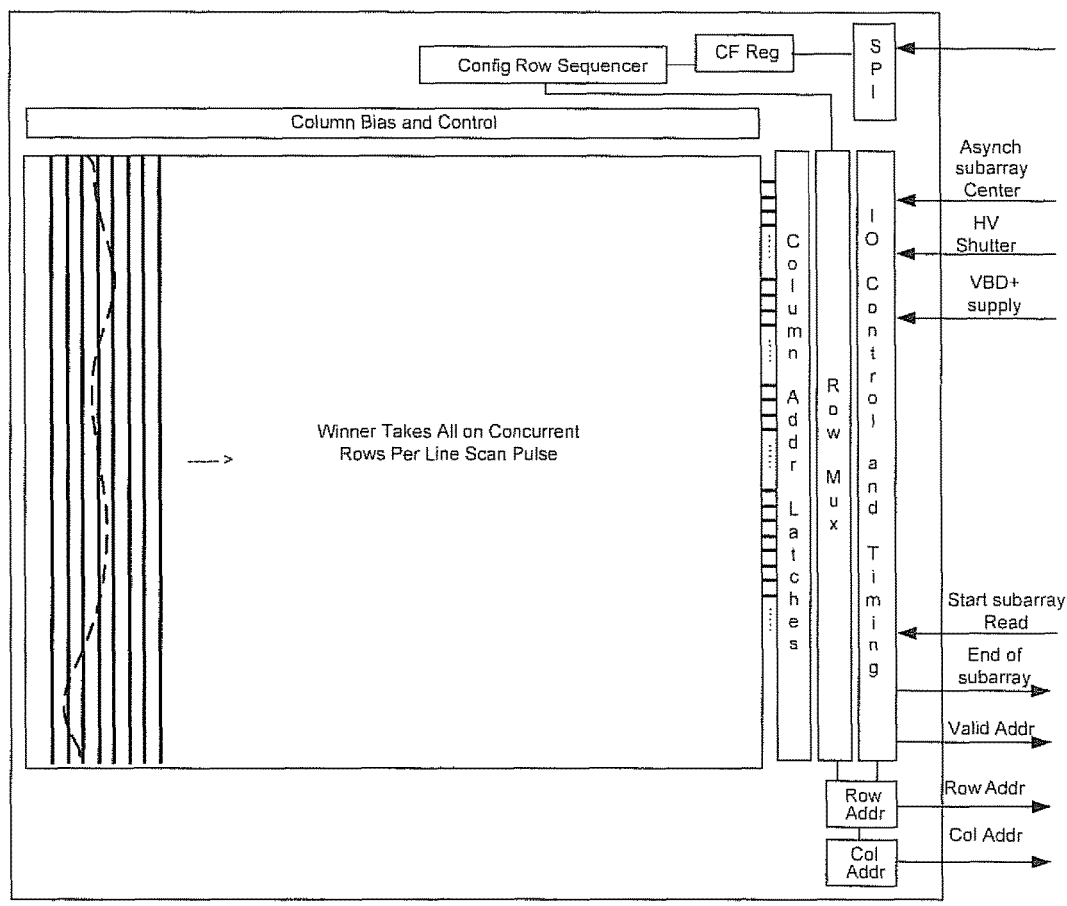
FIG. 16 depicts a schematic of an image sensor architecture, in accordance with embodiments of the present invention.

Referring now to FIG. 16, a block diagram of an image sensor architecture 1600 is depicted according to one embodiment of the present disclosure. As compared with the image sensor architecture 1500, the fast ROM decoder functionality of image sensor architecture 1600 is included at the individual pixel level, and made internal to the image sensor array (e.g., pixel architecture of FIG. 12). However, the set-reset latch circuitry is located external to the array, such that a latch is performed at the row level and only one latch is set per row. The architecture 1600 includes column address latches (e.g., a register bank), including first latches to latch a row scan, and second latches that can be set via a shift from the first latches. The second latches can be read during a subsequent row scan. The image sensor therefore latches at the row level, and decodes at the pixel (cell) level. As described herein, ripple-through logic is included in the image sensor circuitry such that the image sensor array is read along the row latches at the end of the rows (rather than the columns, as described in FIG. 15).

Image sensor architecture 1600 may be configured for a line scan interrogation mode, where all image sensor rows are active concurrently. Based on the time when the interrogation source is activated, one or more row lines of the image sensor array are activated. According to the image sensor architecture 1600, the first photodiode activated on a row will claim the address bus for that row, and therefore a unique image sensor array position is able to be determined for the returned illumination from the interrogation source. In an embodiment there are ten column address lines per row (greater or fewer address lines being possible), a hardwired ROM address for each pixel, such that when a pixel is activated by incoming photons a discrete (e.g., single) column address signals on the address lines to set a corresponding register. This provides the image sensor the capability of identifying the column address of the pixel that was activated last, if one was activated during the measurement period.

This circuitry configuration may be less space efficient than other image sensor architectures disclosed herein, however, improved sensor flexibility can be realized with a column address ROM embedded in each row. Image sensor architecture 1600 is able to employ a sub-array approach (e.g., moving sub-array 550, 550') to control and mediate background noise and other factors during a measurement period. According to an embodiment, full- or partial rows in the image sensor may be enabled by system control substantially simultaneously, for either line scan or dot scan interrogation mode, with the image sensor capable of reporting a first photodiode firing event in each row.

The image sensor as depicted in FIG. 16, having a latch at the row-level, enables parallel operation in the sense that a readout of latched values (that is, row values) can be made simultaneously with an exposure of a next line in the image sensor array. According to embodiments of the present disclosure, the image sensor includes two sets of registers—a first register set for a latched column address (the set including 1 register per row), and a second register set to receive the shift of the value from the first register set. In this manner, with a first measurement cycle, a value of a latched column address for a given row can be written into the first register corresponding to that row. The value is shifted to the second register, enabling subsequent, simultaneous operation of a second measurement (and latch) with a first read operation (from the first measurement cycle). In this manner the latency of a system employing an image sensor according to the present disclosure may be substantially reduced.

An exemplary ranging scenario for an imaging device using image sensor architecture 1600 includes an interrogation source configured to emit a vertical line of illumination (e.g., line scan mode). The interrogation beam incident upon an object having 3D contours will have a returned illumination that is no longer strictly vertical, the resulting variance occurring according to the particular contours of the 3D object. This returned illumination will therefore have a non-uniform aspect (e.g., not uniformly vertical), represented by the curved, dashed line of FIG. 16. The image sensor architecture operates to set a row latch when a first photodiode is activated (e.g., a SPAD firing event), and the image sensor circuitry is configured such that the setting of the latch prevents other neighboring photodiodes from activating until a master reset is performed. The master reset is activated to ready the image sensor for a subsequent measurement period. According to embodiments of the present disclosure, decision logic is incorporated by the image sensor array such that a first detected photodiode activation on a row claims the column address for that measurement period, for the entire row. This decision logic is replicated on each row of the image sensor, such that a row-by-row set is achieved. It will be appreciated that while decision logic is described on a row-by-row basis, the image sensor architecture may also be configured for column-by-column logic and measurement.

Therefore, for a vertical interrogation beam, there is a contour line of activated photodiodes on the image sensor, one per row, which is able to be read. During a readout of the image sensor, if there is a row wherein no photodiodes were activated the ripple-through logic causes readout of that row to be skipped and the subsequent row to be read. In this manner the image sensor is made more efficient in both readout time and power required. The ripple-through logic will continue until the next row having a latch set during the measurement period is met, at which point a read will occur to output the address of the activated photodiode on that row. The ripple-through logic is self-timed, commencing with a single input trigger signal to the image sensor array.

In another embodiment of the present disclosure, image processing and pattern recognition paradigms different from those used with conventional CIS pixels are able to be utilized which are based on a binary pixel output in combination with local decision making made possible by the high photon sensitivity. As a non-limiting example, in the case of SPAD pixels utilizing high voltage pins for reverse biasing, implementation of a floating gate programming scheme for mismatch calibration and pixel decision circuits is made. In a further example, each pixel is calibrated and digitally corrected for mismatch with a parallel memory array using the same addressing decoder scheme as the pixel array. The embodiment described here is able to be used with, for example, a massively parallel asynchronous event bus when used in conjunction with an adequately high speed interconnect and other components. The embodiment described here may also be implemented in a way such that the photon input timing and geometry (e.g. spot, pattern, line, or flash) are controlled with the interrogation light source and the pixel decision response is tailored according to the interrogation light source type. In an embodiment, a SPAD pixel is implemented using different configurations and/or methods of operation, including, for example, use of a current mirror (e.g. for constant current operation regardless of load conditions), a latching scheme (e.g. to initialize and terminate event driven activities), internally triggered avalanche events (e.g. to initiate time measurement activities), etc.

Single or Stacked Wafer Image Sensor Fabrication

According to embodiments of the present disclosure, a semiconductor device can be fabricated on one substrate (e.g., pixel 140b of FIG. 1), or on stacked substrates having at least two layers with portions configured to operate at different voltages (e.g., pixel 140a of FIG. 1). According to embodiments of the present disclosure, fabrication of a single substrate semiconductor device includes formation of photodiodes (e.g., 145b of FIG. 1), which can be ground-referenced photodiodes, along with circuit elements (e.g., 150b of FIG. 1) sharing a same substrate as the photodiodes, the circuit elements providing the logic and control (e.g., latches, decode and control, read logic, enable signals) as described in the various embodiments herein.

Figure 17:
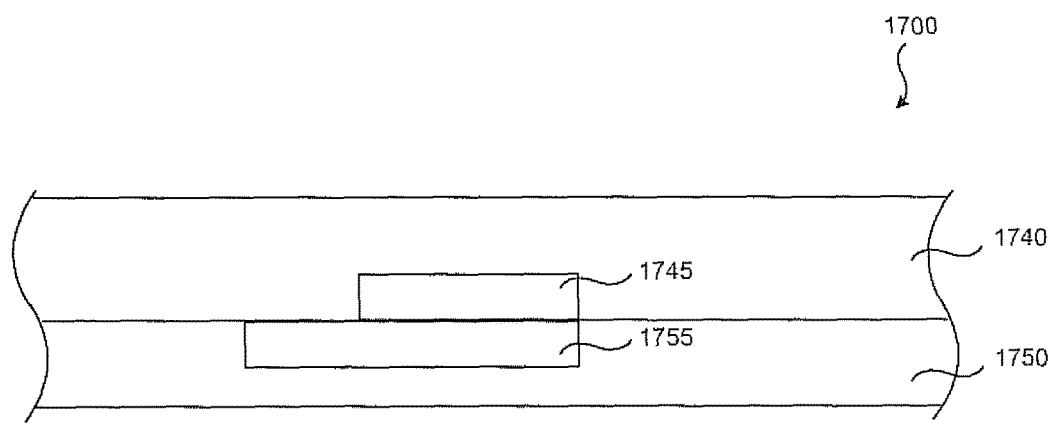
FIG. 17 depicts a schematic semiconductor device having at least two layers with portions configured for operation at a first and a second voltage, in accordance with embodiments of the present invention.

Referring now to FIG. 17, a portion of a semiconductor device 1700 is depicted. The semiconductor device includes at least two layers, a first layer 1740 and a second layer 1750. The first layer 1740 includes a first portion 1745, and the second layer 1750 includes a second portion 1755. According to embodiments of the present disclosure, the first portion 1745 is configured to operate at a first voltage, and the second portion 1755 is configured to operate at a second voltage. According to an embodiment, the first voltage and the second voltage are different. According to an embodiment, the first voltage is higher than the second voltage. According to an embodiment, the first layer 1740 includes diffusions forming a photodiode (e.g., 145a of FIG. 1, an active photodiode, or a SPAD), and the second layer 1750 includes circuitry corresponding to logic and control (e.g., 150a of FIG. 1, latches, decode and control, read logic, enable signals). As a non-limiting example, second layer 1750 logic and control circuitry can provide circuit logic functionality depicted in the portions of FIG. 11 not included in high-voltage portion 1145. The second layer 1750 can include transistors, resistors, capacitors, and other components appreciated by one of skill in the art to provide the logic and control functionality described herein. The first portion 1745 can include an array of photodiodes.

Figure 18:
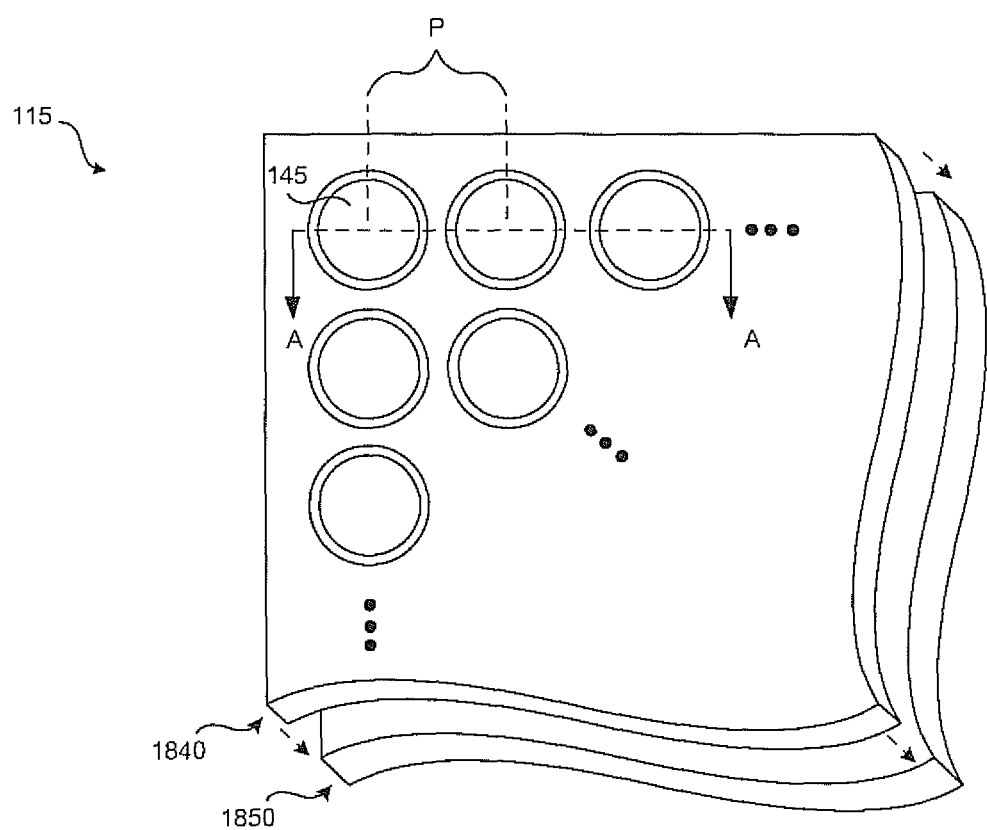
FIG. 18 depicts an imaging sensor array having a stacked wafer design, in accordance with embodiments of the present invention.

According to an embodiment of the present disclosure, an image sensor array is fabricated having a stacked wafer design, where a top wafer (e.g., a wafer corresponding to a top side of an imaging sensor array exposed to incident illumination) is doped to form SPAD cells (e.g., is a SPAD wafer), and a bottom wafer is formed to have logic and control circuitry to provide the structure and functionality of imaging sensor embodiments as disclosed herein. Referring now to FIG. 18, a portion of an imaging sensor 115 is depicted having a wafer 1840 including SPAD cells with photosensitive regions 145, the wafer 1840 stacked over a logic and control circuitry wafer 1850. While the SPAD wafer 1840 and logic and control circuitry wafer 1850 are depicted as separated, in operation (that is, implemented in a ranging system) the SPAD wafer 1840 and logic and control circuitry wafer 1850 can be two substrates bonded together (as indicated by dashed arrows), or can be of one substrate, as described herein.

A stacked wafer orientation of a SPAD wafer 1840 over a logic and control circuitry wafer 1850 enables reduced pixel pitch P (that is, closer SPAD cells) compared to implementations where each SPAD cell contains control and logic circuitry, on the same wafer. For example, pixel pitch P can be 3-4 microns. According to an embodiment of the present disclosure, a SPAD wafer is a high-voltage (HV) diffusion wafer, while the logic and control circuitry wafer is low voltage (LV) wafer. An LV wafer enables finer features than an HV wafer, increasing the number of transistors that can be formed on the wafer for a given space.

Figure 19:
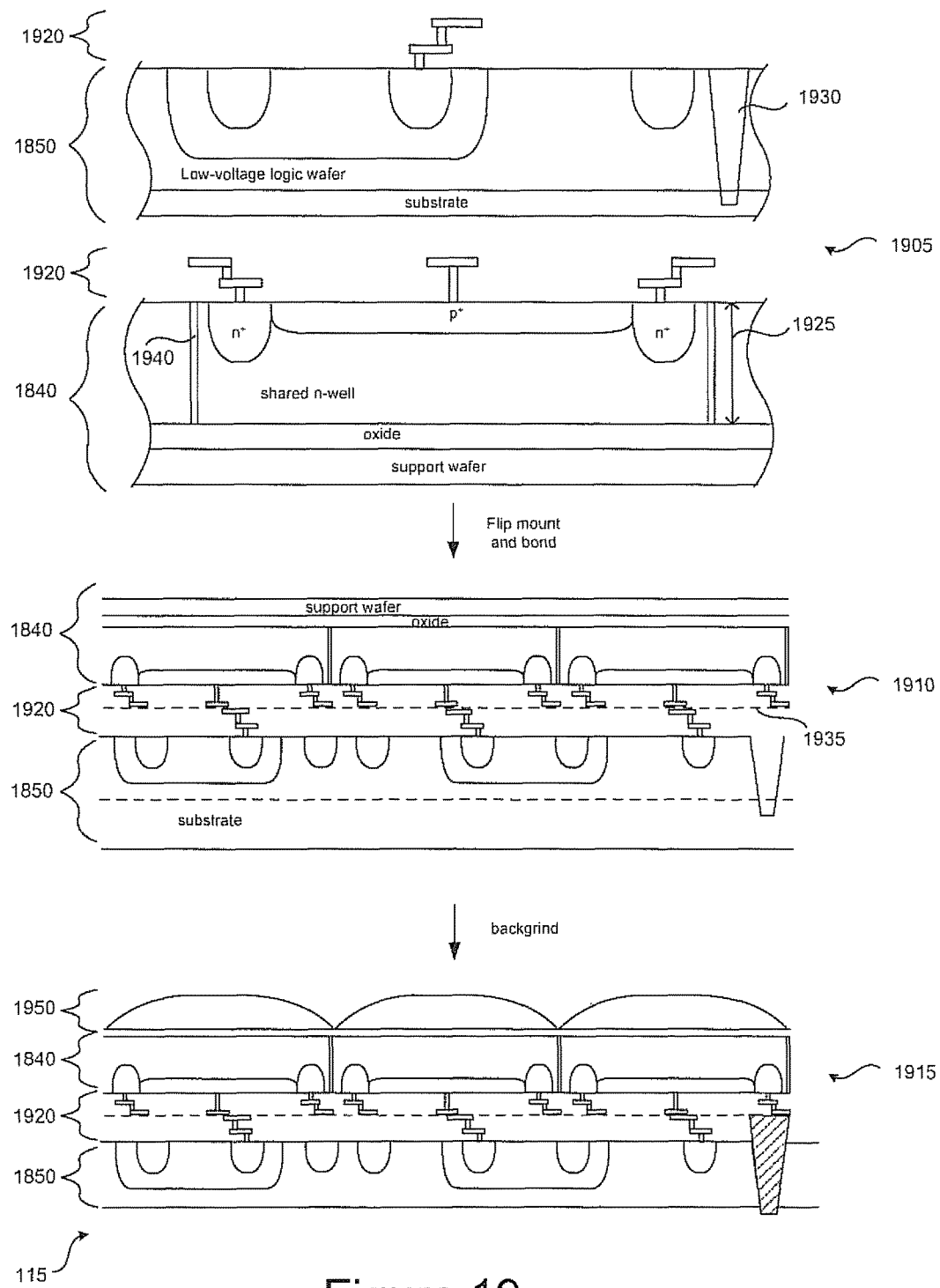
FIG. 19 depicts processing steps for fabrication of an imaging sensor array having a stacked wafer design, in accordance with embodiments of the present invention.

Referring now to FIG. 19, processing steps 1905-1915 for fabrication of an imaging sensor array 115 having a stacked wafer design are depicted according to embodiments of the present disclosure. The portion of imaging sensor array 115 shown in FIG. 19 corresponds to section A-A from FIG. 18. At step 1905, logic and control circuitry wafer 1850 is shown, including depletion regions, interconnections 1920, and a through-silicon via 1930. According to an embodiment, the logic and control circuitry wafer 1850 is formed on a low-voltage CMOS wafer.

Also at step 1905 a SPAD wafer 1840 is shown, the SPAD wafer 1840 including depleted p-n junctions. SPAD wafer 1840 can be a CMOS wafer, for example a high voltage CMOS wafer. The p diffusion can correspond with a photosensitive region of a SPAD cell and can be configured surrounded by n-diffusions, which act as a barrier from activation of the SPAD diode by neighboring SPAD cells. According to an embodiment, the SPAD diodes can share an n-well. Neighboring SPAD cells of the SPAD wafer 1840 can further be isolated by isolation trenches 1940. SPAD wafer 1840 includes metal interconnections 1920. The SPAD wafer 1840 can be built as a silicon-on-insulator (SOI) wafer. The insulator can be, for example, an oxide layer. At step 1905 SPAD wafer 1840 can further include a support wafer. The SPAD wafer 1840 and logic and control circuitry wafer 1850 are co-designed (e.g., positions of interconnects), and have a same die size. According to an embodiment, interconnections 1920 are an array of cathode/anode pads. According to an embodiment, high voltage wiring can be limited to cathode wiring only at the SPAD wafer 1840, removing isolation requirements on logic and control circuit 1850 wafer. In this embodiment array interconnects 1920 are reduced to low voltage anode only.

At step 1910 the SPAD wafer 1840 is mounted face-to-face over the logic and control circuitry wafer 1850 in a stacked orientation (e.g., flip-chip mounted), such that the interconnects of each wafer are toward the center of the stack. The wafers are then bonded together. All of the interconnection between logic and control circuitry wafer 1850 and SPAD wafer 1840 is accomplished in the middle of the stack (that is, at the face interface). Therefore, all of the interconnection metal arrayed across the SPAD wafer 1840 surface does not shield the diffusions from incident illumination. SPAD pixels have one wire connection per cell (e.g., anode), down to logic and control circuitry wafer 1850. All of the fine features (for the image sensor logic) are located at the logic and control circuitry wafer 1850. According to an embodiment, the only connection that is made between the layers of the wafers is the anode connection. For example, a high voltage cathode connection at the top (SPAD) provides a connection corresponding to the high voltage supply of an imaging sensor array, while low voltage connections correspond to row enable, and read signals.

At step 1915 the bonded wafers 1840 and 1850 undergo backside grinding in order to thin the stack, with substrate removal from logic and control circuitry wafer 1850 sufficient to expose TSV 1930, and support wafer removal from SPAD wafer 1840. While TSV 1930 is shown, other connections (e.g., bond wires) are possible, with other bonding schemes. The pixel pitch of an imaging sensor array formed according to embodiments of the present disclosure is approximately 3 microns. After backgrinding, a microlens array 1950 is attached to the backside of the SPAD wafer 1840, in order to increase fill factor of SPAD pixels in imaging sensor array 115. SPAD wafer 1840 is configured for backside illumination. Advantageously, sensitivity to illumination in the infrared spectrum is increased with a SPAD wafer 1840 oriented in the manner described herein, as sensitivity of a photosensitive element to infrared wavelengths increases at greater depths from the incident surface. The thickness 1725 of the SPAD wafer 1840, which can be a thickness of an epitaxially grown substrate, can be selected based on the particular optical interrogation wavelength with which an optical interrogation system is configured to operate.

Figure 20:
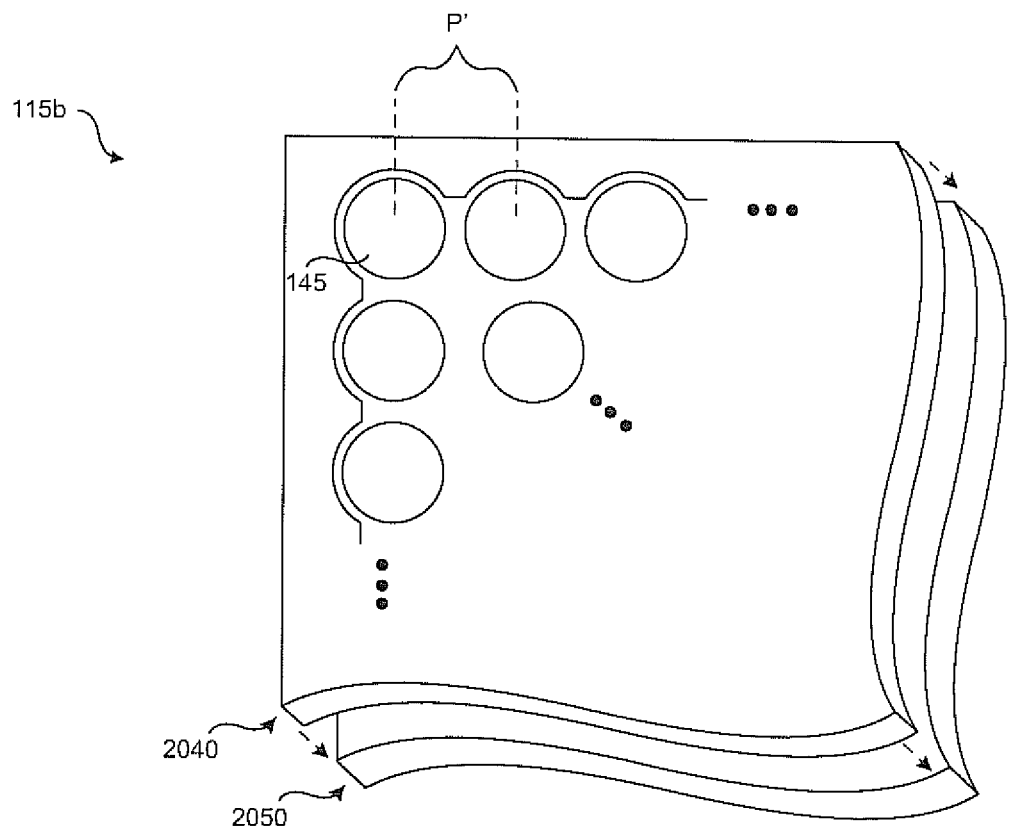
FIG. 20 depicts an imaging sensor array having a stacked wafer design and a reduced pixel pitch, in accordance with embodiments of the present invention.

Referring now to FIG. 20, an imaging sensor array 115*b* having a stacked wafer design and a reduced pixel pitch P' in accordance with embodiments of the present disclosure is depicted. Imaging sensor array 115*b* includes a wafer 2040 including SPAD cells with photosensitive regions 145, the wafer 2040 stacked over a logic and control circuitry wafer 2050. The imaging sensor array 115*b* includes pixel having a reduced pitch P', due to a shared HV n-wells and inter-cell n-diffusions. This is enabled due to the n-well having a constant HV input, along with the fact that only local junctions break down with direct photon incidence. Because image sensor array architectures according to the present disclosure enable global control of high voltage signals, HV n-wells and inter-cell isolation n-diffusions can be shared. An image sensor according to the embodiment of FIG. 20 has an n diffusion shared by multiple p diffusions. This enables the imaging sensor array configuration shown, having pixel pitch P' of, for example, 2-3 microns, further increasing the resolution capability of an imaging sensor in a ranging device. Referring now to FIG. 20, an imaging sensor array 115*b* having a stacked wafer design and a reduced pixel pitch P' in accordance with embodiments of the present disclosure is depicted. Imaging sensor array 115*b* includes a wafer 1840 including SPAD cells with photosensitive regions 145, the wafer 1840 stacked over a logic and control circuitry wafer 1850. The imaging sensor array 115*b* includes pixel having a reduced pitch P', due to a shared HV n-wells and inter-cell n-diffusions. This is enabled due to the n-well having a constant HV input, along with the fact that only local junctions break down with direct photon incidence. Because image sensor array architectures according to the present disclosure enable global control of high voltage signals, HV n-wells and inter-cell isolation n-diffusions can be shared. This enables the imaging sensor array configuration shown, having pixel pitch P' of, for example, 2-3 microns, further increasing the resolution capability of an imaging sensor in a ranging device.

Figure 21:
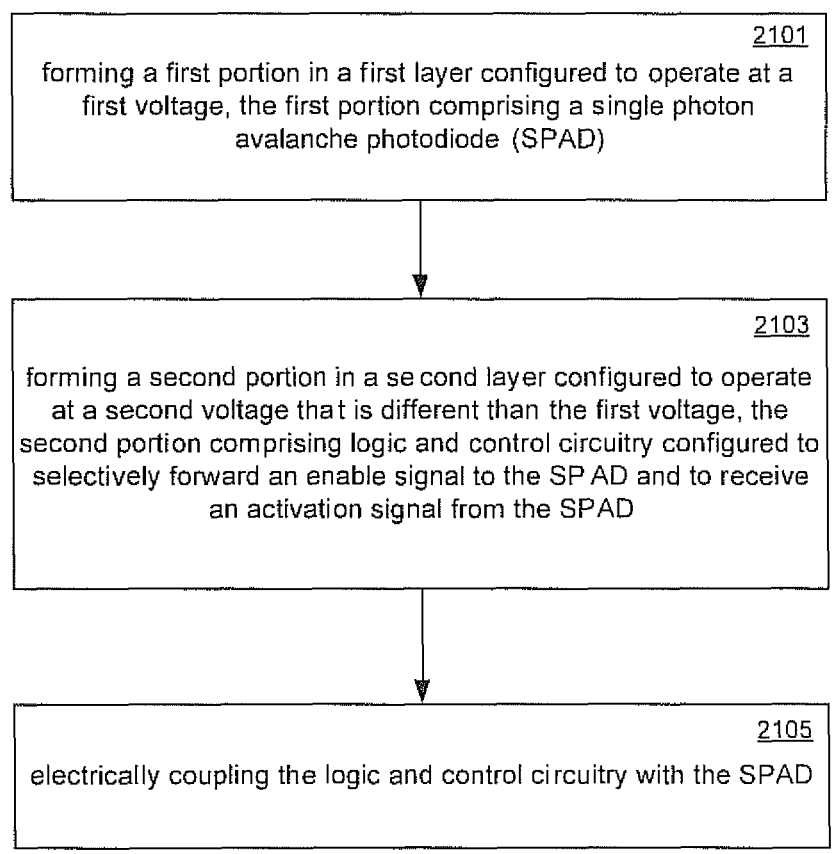
FIG. 21 is a flowchart illustrating a method of fabricating a semiconductor device, in accordance with an embodiment of the present invention.

Referring now to FIG. 21, a flowchart 2100 of a method of fabricating a semiconductor device is depicted, in accordance with an embodiment of the present disclosure. The semiconductor device can be an imaging sensor (e.g., imaging sensor 115).

At step 2101 a first portion is formed in a first layer, the first portion configured to operate at a first voltage. The first portion includes a photodiode, for example, a SPAD.

At step 2103 a second portion is formed in a second layer, the second portion configured to operate at a second voltage. The second voltage can be different than the first voltage. According to an embodiment, the first voltage is higher than the second voltage (for example, the first voltage corresponding to a high-voltage CMOS wafer, the second voltage corresponding to a low-voltage CMOS wafer). The second portion includes logic and control circuitry configured to selectively forward an enable signal to the photodiode in the first portion, and to receive an activation from the photodiode.

At step 2105 the logic and control circuitry is electrically coupled with the photodiode. According to an embodiment, the logic and control circuitry and photodiode are electrically coupled via damascene interconnects. According to an embodiment, logic and control circuitry and photodiode are electrically coupled via bond pads.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A sensor for measuring a distance to an object, the sensor comprising:
   an image sensor comprising an array of photodiodes, the image sensor operatively coupled to an interrogation source and configured to receive a reflected beam generated by illumination of the object by an interrogation beam of the interrogation source, and wherein the image sensor is configured to develop a signal based on an array address of a photodiode of the array of photodiodes activated by incidence of the reflected beam on the array;
   a memory comprising a latch circuit configured to generate a set signal in direct response to the photodiode receiving the reflected beam, wherein the set signal reports the array address of the photodiode;
   an address decode circuit configured to store the array address;
   a timing circuit operatively coupled to the address decode circuit for reading the array address; and
   an analysis circuit operatively coupled to the interrogation source and to the image sensor, and configured to determine a distance to the object based upon the controlled angle of the photonic interrogation source and upon the array address.

2. The sensor according to claim 1, wherein the address decode circuit comprises a memory configured to store column addresses of the array of photodiodes, and wherein each photodiode of the array of photodiodes is operatively coupled to a respective latch circuit.

3. The sensor according to claim 2, wherein the timing circuit is configured to determine a state of the columns addresses sequentially, and further configured to withhold activation of timing of a read for a next column address until the column address corresponding to the reported array address is reached.

4. The sensor according to claim 2, wherein each photodiode of the array of photodiodes is operatively coupled to a respective address decode circuit configured to store a respective column address, and wherein each row of the array of photodiodes is operatively coupled to a respective row latch circuit.

5. The sensor according to claim 4, wherein the set signal is configured to deactivate other photodiodes of the array of photodiodes on a same row as the photodiode receiving the reflected beam.

6. The sensor according to claim 4, wherein the timing circuit is configured to determine a state of the respective row latch circuits sequentially, and further configured to withhold activation of timing of a read for a next row latch circuit until the row latch circuit corresponding to the reported array address is reached.

7. The sensor according to claim 1, wherein the array of photodiodes comprises avalanche photodiodes configured to operate in Geiger mode.

8. The sensor according to claim 1, wherein the array of photodiodes comprises active photodiodes, and further wherein a photodiode of the array of photodiodes is activated when a voltage of the photodiode reaches a threshold level based on incident photons.

9. The sensor according to claim 1, wherein the image sensor is disposed at a controlled distance from the interrogation source, and the analysis circuit is configured to determine the distance to the object based on triangulation of the controlled angle, the controlled distance, and an angle of incidence determined by the array address of the photodiode.

10. The sensor according to claim 1, wherein a control timing circuit activates photodiodes of the array of photodiodes with a controlled activation period, based on a time-of-flight and a return angle of the interrogation beam to return to the image sensor at a maximum range.

11. The sensor according to claim 8, wherein the sensor further comprises an ambient light sensor configured to detect an ambient light level, and further wherein the controlled activation period is based on a detected ambient light level.

12. A pixel circuit, comprising:
    a photodiode;
    a load comprising at least one of an active and a passive element, electrically coupled to the photodiode; and
    a plurality of transistors electrically coupled to the photodiode, the plurality of transistors comprising a latch circuit;
    wherein a control of the photodiode is referenced to ground and configured to selectively activate the photodiode, wherein the photodiode that is referenced to ground is configured to develop a current based on photons incident at the photodiode, the load configured to convert the current to a voltage pulse, the voltage pulse configured as an input to set a logic level of the latch circuit.

13. The pixel circuit according to claim 12, wherein the pixel circuit further comprises a voltage clamp circuit electrically coupled to the photodiode and to the control, the voltage clamp configured to limit a voltage level of the voltage pulse input to the latch circuit.

14. The pixel circuit according to claim 12, wherein the photodiode is an avalanche photodiode configured to operate in Geiger mode, and the current is an avalanche current triggered by the photons.

15. The pixel circuit according to claim 12, wherein the photodiode is an active photodiode, and further wherein the current is developed when a voltage of the photodiode reaches a threshold level based on the photons incident at the photodiode.

16. The pixel circuit according to claim 12, wherein the load comprises a resistor.

17. The pixel circuit according to claim 12, wherein the photodiode is actively quenched, to control the time period between successive firings of the photodiode.

* * * * *